(12) United States Patent
Omae et al.

(10) Patent No.: US 7,301,948 B2
(45) Date of Patent: Nov. 27, 2007

(54) ROUTING METHOD, NODE, PACKET COMMUNICATION SYSTEM, PROGRAM, AND RECORDING MEDIUM

(75) Inventors: Koji Omae, Kanagawa (JP); Takehiro Ikeda, Nara (JP); Ichiro Okajima, Kanagawa (JP); Narumi Umeda, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 980 days.

(21) Appl. No.: 10/362,366

(22) PCT Filed: Jun. 28, 2002

(86) PCT No.: PCT/JP02/06616

§ 371 (c)(1),
(2), (4) Date: Feb. 27, 2003

(87) PCT Pub. No.: WO03/003673

PCT Pub. Date: Jan. 9, 2003

(65) Prior Publication Data

US 2003/0179751 A1    Sep. 25, 2003

(30) Foreign Application Priority Data

Jun. 28, 2001    (JP)    ............... 2001-197216

(51) Int. Cl.
H04L 12/28    (2006.01)
H04L 12/56    (2006.01)
H04J 3/24    (2006.01)

(52) U.S. Cl. ............... 370/392; 370/473; 370/474

(58) Field of Classification Search ............... None
See application file for complete search history.

(56) References Cited

U.S. PATENT DOCUMENTS 6,359,574 B1 *    3/2002    Yariv ............... 341/50

(Continued)

FOREIGN PATENT DOCUMENTS

EP    1 032 165 A1    8/2000

(Continued)

OTHER PUBLICATIONS

Werner Bux, et al., "Technologies and Building Blocks for Fast Packet Forwarding", IEEE Communications Magazine, XP-001006836, vol. 39, No. 1, Jan. 1, 2001, pp. 70-77.

Primary Examiner—Ronald Abelson
(74) Attorney, Agent, or Firm—Oblon, Spivak, McClelland, Maier & Neustadt, P.C.

(57) ABSTRACT

A configuration comprises a destination address extracting/rewriting device 4 for extracting a destination address of a packet; a common-route packet extracting device 8 for extracting two or more packets having a common route at least in part of routes to their respective terminals from a plurality of packets, based on their extracted destination addresses; an aggregate packet creating device 9 for aggregating the plurality of packets having the common route at least in part of the routes to create an aggregate packet including information of each of the packets; a destination address giving device 10 for giving the aggregate packet a destination address so that the destination address of the aggregate packet is an address of an adjacent node on the common route; and an aggregate packet routing device 11 for routing the aggregate packet, based on the destination address.

22 Claims, 20 Drawing Sheets

U.S. PATENT DOCUMENTS 6,651,222 B2 * 11/2003 Gupta et al. .................... 716/1
6,678,474 B1 * 1/2004 Masuda et al. ................ 398/75
6,970,478 B1 * 11/2005 Nishihara ................... 370/474

FOREIGN PATENT DOCUMENTS

| | | |
|---|---|---|
| JP | 62-279400 | 12/1987 |
| JP | 63-197148 | 8/1988 |
| JP | 2000-349828 | 12/2000 |
| WO | 97/33406 | 9/1997 |
| WO | WO 00/72532 A1 | 11/2000 |
| WO | WO 01/17155 A2 | 3/2001 |

* cited by examiner

Fig.5
- IP PACKET FORMAT
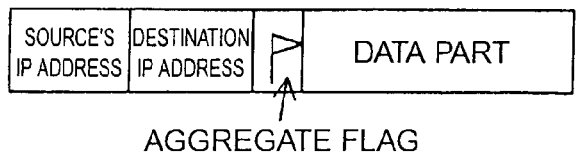
- IP PACKET I, IP PACKET VI
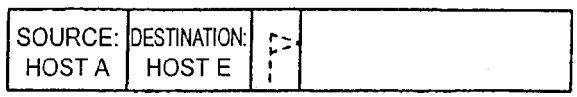
- IP PACKET II, IP PACKET VII
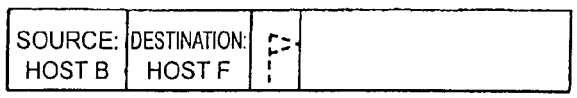
- IP PACKET III
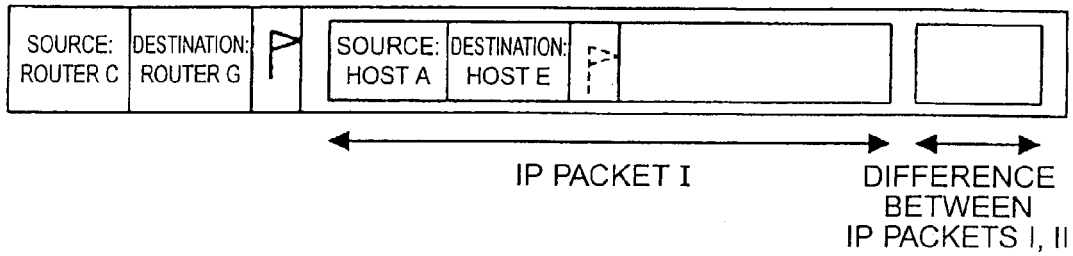
- IP PACKET IV
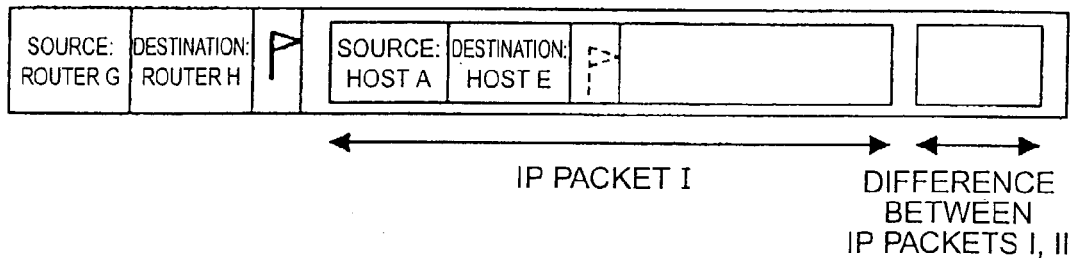
- IP PACKET V
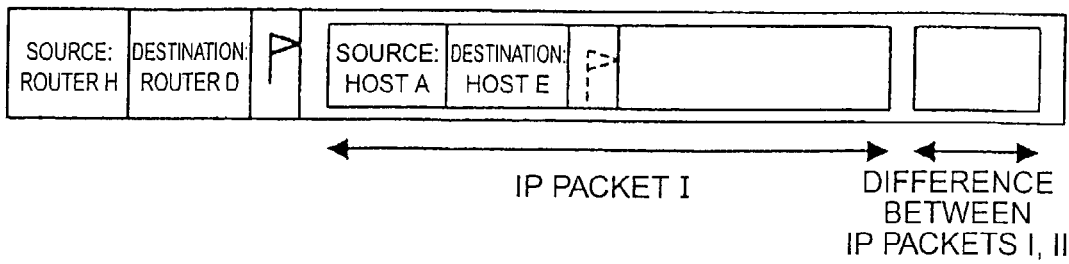

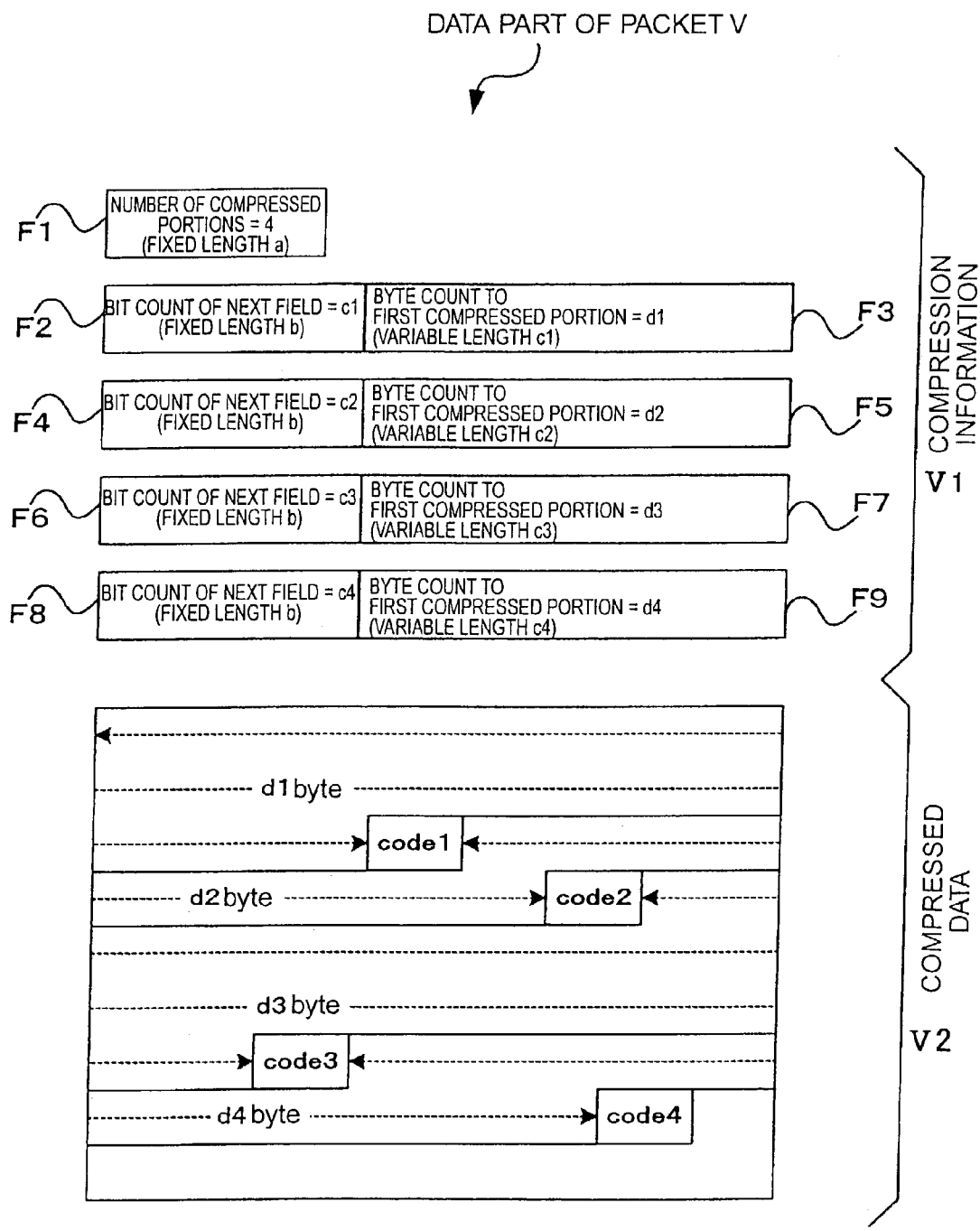

Fig.17
- IP PACKET FORMAT
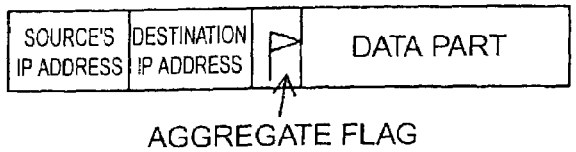
AGGREGATE FLAG
- IP PACKET I, IP PACKET IV
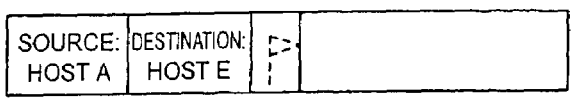
- IP PACKET II, IP PACKET V
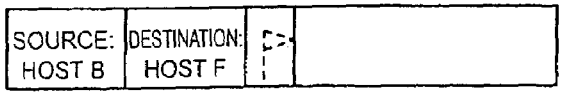
- IP PACKET III
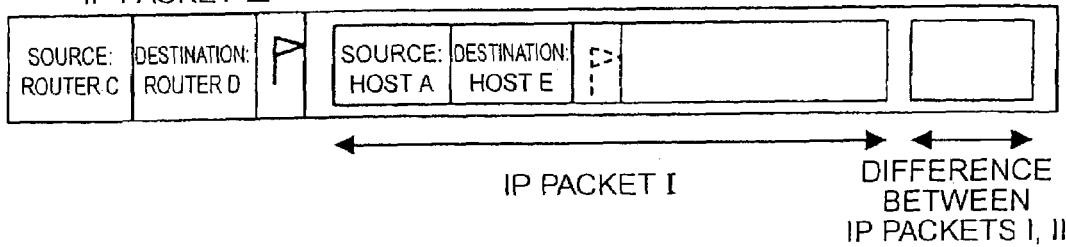

Fig. 20
FORMAT OF ETHERNET FRAME
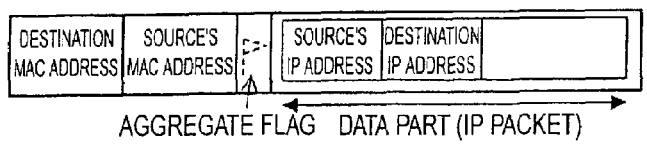
AGGREGATE FLAG  DATA PART (IP PACKET)
ETHERNET FRAME I
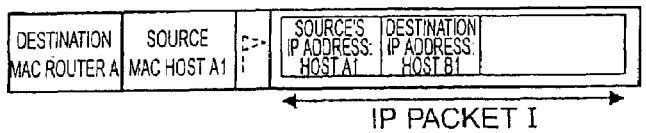
IP PACKET I
ETHERNET FRAME II
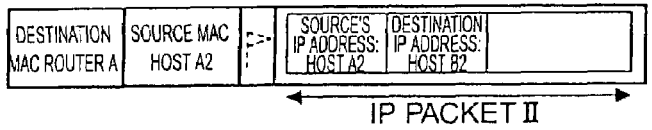
IP PACKET II
ETHERNET FRAME III
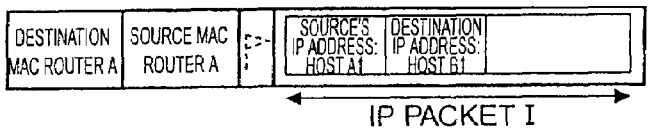
IP PACKET I
ETHERNET FRAME IV
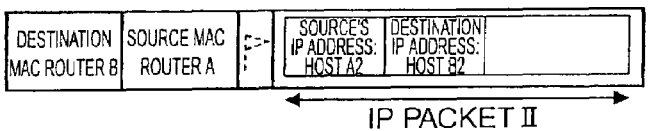
IP PACKET II
ETHERNET FRAME V
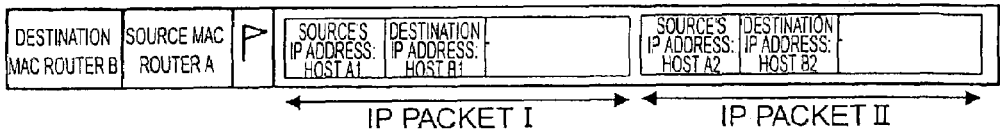
IP PACKET I      IP PACKET II
ETHERNET FRAME VI
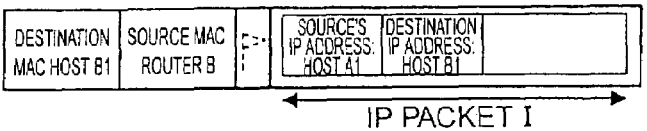
IP PACKET I
ETHERNET FRAME VII
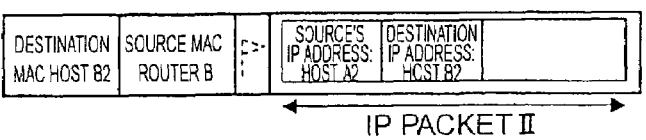
IP PACKET II

ROUTING METHOD, NODE, PACKET COMMUNICATION SYSTEM, PROGRAM, AND RECORDING MEDIUM

TECHNICAL FIELD

The present invention relates to routing methods, nodes, packet communication systems, programs, and recording media improved in utilization efficiency of network resources in networks using the packet switching system.

BACKGROUND ART

In the conventional technology, even in the case where a plurality of packets with a destination of a common node and with equal data continuously arrive at a node performing routing, the packets are processed independently of each other. Namely, the node performing routing specifies the destination node with reference to header information of all the arriving packets and performs the routing of each packet toward the destination.

DISCLOSURE OF THE INVENTION

In the above conventional technology, however, a number of equal data are transmitted toward the same node on a certain link, which poses a problem that the link band is oppressed by link layer headers. The oppression of the link band is also caused by the transmission without data compression of packets.

An object of the present invention is, therefore, to provide routing methods, nodes, packet communication systems, programs, and recording media succeeding in reducing the amount of communication data and achieving efficient utilization of network resources.

In order to accomplish the above object, the present invention involved the means described below.

Specifically, a routing method according to the present invention is a routing method of, based on a destination address given to a packet, routing the packet, the method comprising: a step of extracting a destination address of a packet; a step of extracting two or more packets having a common route at least in part of routes to their respective terminals, from a plurality of packets, based on their respective destination addresses thus extracted; a step of aggregating the two or more packets having the common route at least in part of the routes to create an aggregate packet including information of each of the packets; a step of giving the aggregate packet a destination address so that the destination address of the aggregate packet is an address of an adjacent node on the common route; and a step of routing the aggregate packet, based on the destination address.

According to the present invention, when two or more packets have a common route at least in part of their routes to terminal addresses, information pieces of the packets are aggregated to reconfigure an aggregate packet. Therefore, the above method decreases the total number of transmitted packets and also decreases the number of references to a routing table. This reduces the processing load and increases the processing speed. As a result, it becomes feasible to achieve efficient utilization of the network resources.

A preferred routing method according to the present invention is a routing method of, based on a destination address given to a packet, routing the packet, the method comprising: a step of extracting a destination address of a packet; a step of recovering a plurality of original packets from an aggregate packet in which the plurality of packets are aggregated; a step of determining whether the recovered packets have a common route at least in part of routes to their respective terminals, based on destination addresses of the respective packets; and a step of performing routing in such a way that when the result of the determination is that the packets have the common route at least in part of the routes, a destination address of the aggregate packet is rewritten so that the destination address of the aggregate packet is an address of an adjacent node on the common route, and the aggregate packet is routed based on the destination address, or in such a way that when the packets have no common route, the recovered packets are routed based on their respective destination addresses.

According to the present invention, it is determined whether the aggregate packet should be relayed in that state to a next node, or the plurality of original packets should be recovered from the aggregate packet and be relayed. When the result of this determination is that the packets have a common route at least in part of their routes, the destination address of the aggregate packet is rewritten so that the destination address of the aggregate packet is an address of an adjacent node on the common route, and the aggregate packet is then routed. Accordingly, it becomes feasible to decrease the total number of packets on the network.

A preferred routing method according to the present invention is a routing method of, based on a destination address given to a packet, routing the packet, the method comprising: a step of extracting a destination address of a packet; a step of extracting two or more packets having a common route at least in part of routes to their respective terminals, from a plurality of packets, based on their respective destination addresses thus extracted; a step of aggregating the two or more packets having the common route at least in part of the routes to create an aggregate packet including information of each of the packets; a step of giving the aggregate packet a destination address so that the destination address of the aggregate packet is an address of a predetermined node having a function of recovering the two or more original packets from the aggregate packet; and a step of routing the aggregate packet, based on the destination address thus determined.

According to the present invention, the destination address is given to the aggregate packet so that the destination address of the aggregate packet is the address of the predetermined node having the function of recovering the plurality of original packets from the aggregate packet, whereby it is feasible to designate the node to restore the aggregate packet. This allows only the designated node to restore the aggregate packet, and thus the nodes other than the designated node perform normal routing. As a result, it is feasible to avoid performing dispensable restoring processing and make repeating processing more efficient.

A preferred routing method according to the present invention is a routing method of, based on a destination address given to a packet, routing the packet, the method comprising: a step of extracting a destination address of a packet; a step of determining whether the destination address extracted agrees with an address of its own node; a step of recovering a plurality of original packets from an aggregate packet in which the plurality of packets are aggregated, when the result of the determination is that the destination address extracted agrees with the address of its own node; and a step of routing each of the recovered packets, or the aggregate packet having the destination address disagreeing with the address of its own node, based on the destination address.

According to the present invention, only when the destination address of the aggregate packet agrees with the address of its own node, the plurality of original packets are recovered from the aggregate packet. Namely, the aggregate packet is restored by only the node designated as a restoring node. Since this causes the nodes other than the designated node to carry out the normal routing, it is feasible to avoid performing dispensable restoring processing and make the repeating processing more efficient.

The routing methods according to the present invention preferably comprise a step of setting an aggregate flag indicating an aggregate packet, in header information of the aggregate packet.

This makes it feasible to readily and quickly determine whether a packet is an aggregate packet.

The routing methods according to the present invention preferably comprise a step of comparing the total number of bits of the two or more packets having the common route at least in part of the routes, with the number of bits of the aggregate packet; and a step of routing the aggregate packet, based on the destination address thereof, only when the result of the comparison is that the number of bits of the aggregate packet is smaller than the total number of bits of the two or more packets.

According to the present invention, a plurality of packets are aggregated into a single aggregate packet. This makes it feasible to decrease the total number of packets and the total amount of information transmitted on the network and achieve the efficient utilization of the network resources.

Preferably, the routing methods according to the present invention further comprise a step of compressing the aggregate packet. The compression of the aggregate packet can be implemented, for example, by techniques including a technique of converting a bit pattern included in the aggregate packet, into a predetermined code, a technique of extracting a common bit string included in the plurality of packets, from at least one packet out of the plurality of packets, and so on. This makes it feasible to further decrease the total number of packets and the total amount of information transmitted on the network and achieve more efficient utilization of the network resources.

In the routing methods according to the present invention, it is preferable to employ a configuration wherein targets of aggregation are only packets buffered on a transmission queue of its own router.

This makes it feasible to restrain increase in a delay time of processing due to creation of the aggregate packet at a node having the function of creating the aggregate packet from a plurality of packets.

A node according to the present invention is configured as a node for, based on a destination address given to a packet, routing the packet, the node comprising: destination address extracting means for extracting a destination address of a packet; common-route packet extracting means for extracting two or more packets having a common route at least in part of routes to their respective terminals, from a plurality of packets, based on their respective destination addresses thus extracted; aggregate packet creating means for aggregating the two or more packets having the common route at least in part of the routes to create an aggregate packet including information of each of the packets; destination address giving means for giving the aggregate packet a destination address so that the destination address of the aggregate packet is an address of an adjacent node on the common route; and aggregate packet routing means for routing the aggregate packet, based on the destination address.

In this configuration, when two or more packets have a common route at least in part of their routes to respective terminal addresses, information pieces of the packets are aggregated to reconfigure one aggregate packet, which can decrease the total number of packets transmitted on the network. The decrease in the total number of packets makes it feasible to decrease the number of references to the routing table, to reduce the processing load, and to increase the processing speed. As a result, it becomes feasible to achieve the efficient utilization of the network resources.

A preferred node according to the present invention is configured as a node for, based on a destination address given to a packet, routing the packet, the node comprising: destination address extracting means for extracting a destination address of a packet; recovering means for recovering a plurality of original packets from an aggregate packet in which the plurality of packets are aggregated; determining means for determining whether the recovered packets have a common route at least in part of routes to their respective terminals, based on destination addresses of the respective packets; and packet routing means for performing routing in such a way that when the result of the determination is that the packets have the common route at least in part of the routes, a destination address of the aggregate packet is rewritten so that the destination address of the aggregate packet is an address of an adjacent node on the common route, and the aggregate packet is routed based on the destination address, or in such a way that when the packets have no common route, the recovered packets are routed based on their respective destination addresses.

In this configuration, it is determined whether the aggregate packet should be relayed in that state to a next link, or the plurality of original packets should be recovered from the aggregate packet and be relayed. When the result of this determination is that the original packets have a common route at least in part of their routes, the destination address of the aggregate packet is rewritten so that the destination address of the aggregate packet is an address of an adjacent node on the common route, and the aggregate packet is routed, which makes it feasible to decrease the total number of packets transmitted on the network.

A preferred node according to the present invention is configured as a node for, based on a destination address given to a packet, routing the packet, the node comprising: destination address extracting means for extracting a destination address of a packet; common-route packet extracting means for extracting two or more packets having a common route at least in part of routes to their respective terminals, from a plurality of packets, based on their respective destination addresses thus extracted; aggregate packet creating means for aggregating the two or more packets having the common route at least in part of the routes to create an aggregate packet including information of each of the packets; destination address giving means for giving the aggregate packet a destination address so that the destination address of the aggregate packet is an address of a predetermined node having a function of recovering the two or more original packets from the aggregate packet; and aggregate packet routing means for routing the aggregate packet, based on the destination address thus determined.

As in this configuration, the destination address is given to the aggregate packet so that the destination address of the aggregate packet is the address of the predetermined node having the function of recovering the plurality of original packets from the aggregate packet, whereby it is feasible to designate a node to restore the aggregate packet. This permits only the designated node to restore the aggregate packet, and thus the nodes other than the designated node perform the normal routing. As a result, it is feasible to avoid performing the dispensable restoring processing and make the repeating processing more efficient.

A preferred node according to the present invention is configured as a node for, based on a destination address given to a packet, routing the packet, the node comprising: destination address extracting means for extracting a destination address of a packet; address determining means for determining whether the destination address extracted agrees with an address of its own node; recovering means for recovering a plurality of original packets from an aggregate packet in which the plurality of packets are aggregated, when the result of the determination is that the destination address extracted agrees with the address of its own node; and packet routing means for routing each of the recovered packets, or the aggregate packet having the destination address disagreeing with the address of its own node, based on the destination address.

As in this configuration, the plurality of original packets are recovered from the aggregate packet only when the destination address of the aggregate packet agrees with the address of its own node. Namely, only the node designated as a restoring node restores the aggregate packet. Since this causes the nodes other than the designated node to perform the normal routing, it is feasible to avoid performing the dispensable restoring processing and make the repeating processing more efficient.

The nodes according to the present invention preferably comprise aggregate flag setting means for setting an aggregate flag indicating an aggregate packet, in header information of the aggregate packet.

This makes it feasible to readily and quickly determine whether a packet is an aggregate packet.

The nodes according to the present invention are preferably configured in a configuration comprising: number-of-bits comparing means for comparing the total number of bits of the two or more packets having the common route at least in part of the routes, with the number of bits of the aggregate packet; wherein the aggregate packet routing means routes the aggregate packet, based on the destination address thereof, only when the result of the comparison is that the number of bits of the aggregate packet is smaller than the total number of bits of the two or more packets.

According to the present invention, a plurality of packets are aggregated into a single aggregate packet. This makes it feasible to decrease the total number of packets and the total amount of information transmitted on the network and achieve the efficient utilization of the network resources.

Preferably, the nodes according to the present invention further comprise aggregate packet compressing means for compressing the aggregate packet. The compression of the aggregate packet can be implemented, for example, by the techniques including the technique of converting a bit pattern included in the aggregate packet, into a predetermined code, the technique of extracting a common bit string included in the plurality of packets, from at least one packet out of the plurality of packets, and so on. This makes it feasible to further decrease the total number of packets and the total amount of information transmitted on the network and achieve more efficient utilization of the network resources.

The nodes according to the present invention are preferably configured so that targets of aggregation are only packets buffered on a transmission queue.

This makes it feasible to restrain increase in the delay time of processing due to the creation of the aggregate packet at the node having the function of creating the aggregate packet from a plurality of packets.

A packet communication system according to the present invention is configured to comprise a host for transmitting a packet, the foregoing node for relaying the packet, and a host for receiving the packet.

According to the present invention, when a plurality of packets have a common route at least in part of their routes to respective terminal addresses, information pieces of the packets are aggregated to reconfigure one aggregate packet, which can decrease the total number of packets transmitted on the network. This decreases the number of references to the routing table and reduces the processing load. This makes it feasible to increase the processing speed and, as a result, achieve the efficient utilization of the network resources.

A program according to the present invention is configured as a program of, based on a destination address given to a packet, routing the packet, the program being configured to make a communication device execute the following processes: a process of extracting a destination address of a packet; a process of extracting two or more packets having a common route at least in part of routes to their respective terminals, from a plurality of packets, based on their respective destination addresses thus extracted; a process of aggregating the two or more packets having the common route at least in part of the route to create an aggregate packet including information of each of the packets; a process of giving the aggregate packet a destination address so that the destination address of the aggregate packet is an address of an adjacent node on the common route; and a process of routing the aggregate packet, based on the destination address.

According to the present invention, when two or more packets have a common route at least in part of their routes to respective terminal addresses, information pieces of the packets are aggregated to reconfigure one aggregate packet, which can decrease the total number of packets transmitted on the network. The decrease in the total number of packets makes it feasible to decrease the number of references to the routing table, reduce the processing load, and increase the processing speed. As a result, it becomes feasible to achieve the efficient utilization of the network resources.

A program according to the present invention is configured as a program of, based on a destination address given to a packet, routing the packet, the program being configured to make a communication device execute the following processes: a process of extracting a destination address of a packet; a process of recovering a plurality of original packets from an aggregate packet in which the plurality of packets are aggregated; a process of determining whether the recovered packets have a common route at least in part of routes to their respective terminals, based on destination addresses of the respective packets; and a process of performing routing in such a way that when the result of the determination is that the packets have the common route at least in part of the routes, a destination address of the aggregate packet is rewritten so that the destination address of the aggregate packet is an address of an adjacent node on the common route, and the aggregate packet is routed based on the destination address, or in such a way that when the packets have no common route, the recovered packets are routed based on their respective destination addresses.

According to the present invention, it is determined whether the aggregate packet should be relayed in that state to a next link, or the plurality of original packets should be recovered from the aggregate packet and be relayed. When the result of this determination is that the original packets have a common route at least in part of their routes, the destination address of the aggregate packet is rewritten so that the destination address of the aggregate packet is an address of an adjacent node on the common route, and the aggregate packet is routed, which makes it feasible to decrease the total number of packets transmitted on the network.

A program according to the present invention is configured as a program of, based on a destination address given to a packet, routing the packet, the program being configured to make a communication device execute the following processes: a process of extracting a destination address of a packet; a process of extracting two or more packets having a common route at least in part of routes to their respective terminals, from a plurality of packets, based on their respective destination addresses thus extracted; a process of aggregating the two or more packets having the common route at least in part of the routes to create an aggregate packet including information of each of the packets; a process of giving the aggregate packet a destination address so that the destination address of the aggregate packet is an address of a predetermined node having a function of recovering the two or more original packets from the aggregate packet; and a process of routing the aggregate packet, based on the destination address thus determined.

According to the present invention, the destination address is given to the aggregate packet so that the destination address of the aggregate packet is the address of the predetermined node having the function of recovering the plurality of original packets from the aggregate packet, whereby it is feasible to designate the node to restore the aggregate packet. This permits only the designated node to restore the aggregate packet, and thus the nodes other than the designated node perform the normal routing. As a result, it is feasible to avoid performing the dispensable restoring processing and make the repeating processing more efficient.

A program according to the present invention is configured as a program of, based on a destination address given to a packet, routing the packet, the program being configured to make a communication device execute the following processes: a process of extracting a destination address of a packet; a process of determining whether the destination address extracted agrees with an address of its own node; a process of recovering a plurality of original packets from an aggregate packet in which the plurality of packets are aggregated, when the result of the determination is that the destination address extracted agrees with the address of its own node; and a process of routing each of the recovered packets, or the aggregate packet having the destination address disagreeing with the address of its own node, based on the destination address.

According to the present invention, the plurality of original packets are recovered from the aggregate packet only when the destination address of the aggregate packet agrees with the address of its own node. Namely, only the node designated as a restoring node restores the aggregate packet. Since this causes the nodes other than the designated node to perform the normal routing, it is feasible to avoid performing the dispensable restoring processing and make the repeating processing more efficient.

A recording medium according to the present invention is constructed in a computer-readable configuration in which one of the foregoing programs is recorded.

According to the present invention, when a plurality of packets have a common route at least in part of their routes to respective terminal addresses, information pieces of the packets are aggregated to reconfigure one aggregate packet, which can decrease the total number of packets transmitted on the network. The decrease in the total number of packets makes it feasible to decrease the number of references to the routing table, reduce the processing load, and increase the processing speed. As a result, it becomes feasible to achieve the efficient utilization of the network resources.

BRIEF DESCRIPTION OF THE DRAWINGS

FIG. 5 is a diagram showing configurations of IP packets.

FIG. 8 is a conceptual diagram showing a configuration of a compressed packet by a first packet compressing method.

FIG. 17 is a diagram showing configurations of IP packets.

FIG. 20 is a diagram showing configurations of Ethernet frames.

BEST MODES FOR CARRYING OUT THE INVENTION

First Embodiment

Figure 1:
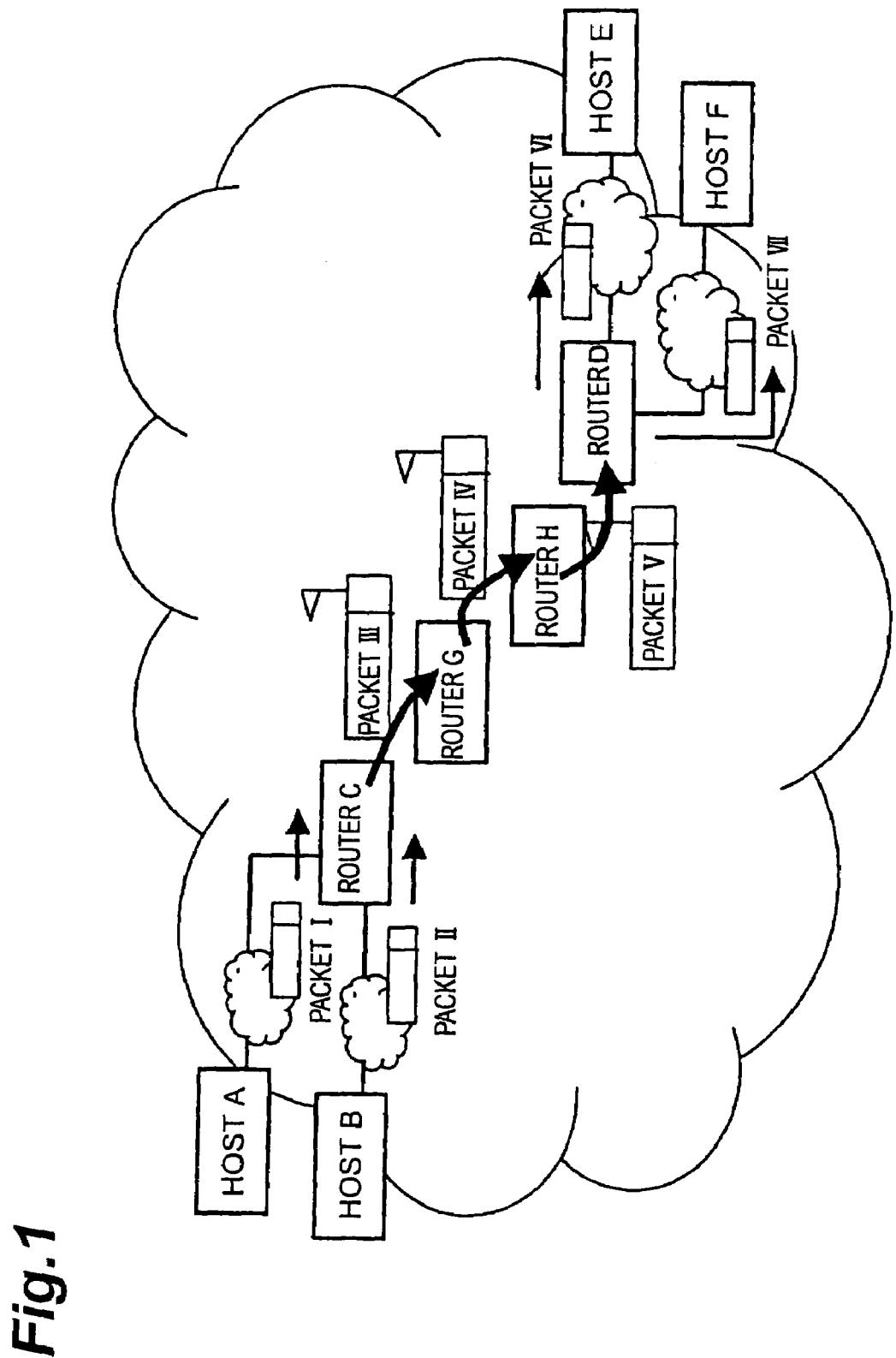
FIG. 1 is a diagram schematically showing a packet communication system as a first embodiment of the present invention.

FIG. 1 is a diagram schematically showing a packet communication system as a first embodiment of the present invention. The nodes in the first embodiment are configured to capsule two or more IP packets together under an IP header to create an aggregate packet. The system herein is constructed on the premise that routing protocols such as OSPF (Open Shortest Path First) and others are active on the network. In FIG. 1, all the routers in the network have a restoring function of restoring an aggregate packet to a plurality of original packets. For example, they are routers C, D, G, and H in FIG. 1. The routers C and H also have an IP capsuling function, i.e., a packet aggregating function of aggregating two or more packets to create one aggregate packet, in addition to the restoring function. The routers G and D having only the restoring function are configured to execute the restoring flow shown in FIG. 4, for each of received packets. The routers C and H having the restoring function and the packet aggregating function are configured to execute the restoring flow shown in FIG. 4, for each of received packets and execute the aggregating flow shown in FIG. 3, on a transmission-side queue.

Figure 2:
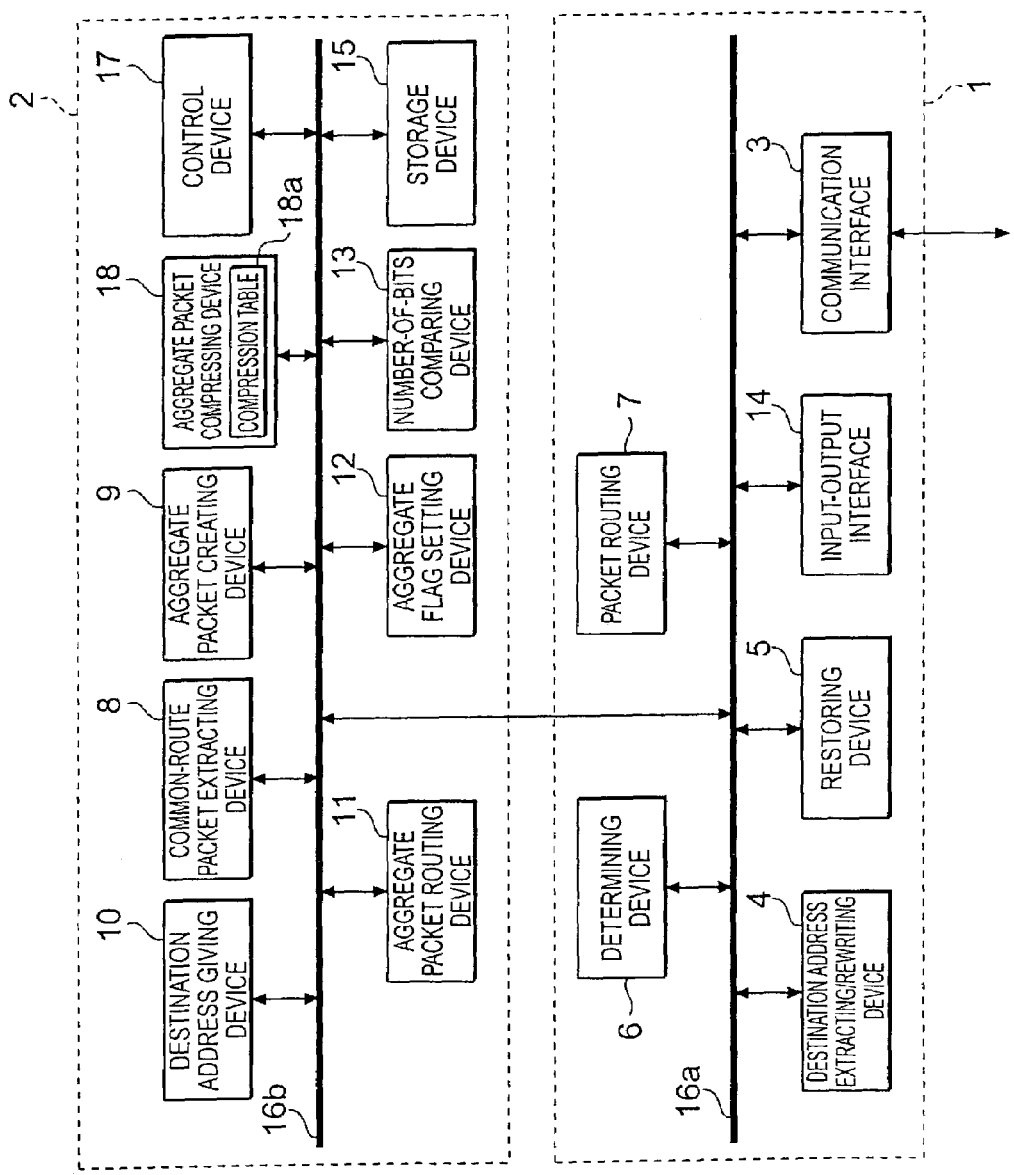
FIG. 2 is a block diagram showing a schematic configuration of a router having the aggregating function and the restoring function.

FIG. 2 is a block diagram showing a schematic configuration of a router having the aggregating function and the restoring function in the first embodiment. This router has a restoring function section 1 and an aggregating function section 2. The restoring function section 1 sends and receives packets through a communication interface 3 to and from a link. A destination address extracting/rewriting device 4 extracts a destination address of a received packet. It further has a function of rewriting a destination address of a received packet. A restoring device 5 restores an aggregate packet as an aggregate of two or more packets to the original packets. A determining device 6 determines whether recovered packets have a common route at least in part of their routes to respective terminals, based on the destination addresses of the respective packets. When the result of the determination at the determining device 6 is that the packets have a common route at least in part of the routes, the destination address extracting/rewriting device 4 rewrites the destination address of the aggregate packet so that the destination address of the aggregate packet is an address of an adjacent node on the common route (a router in the first embodiment). A packet routing device 7 routes the aggregate packet, based on the destination address thus rewritten. When the result of the above determination is that the recovered packets have no common route on the other hand, the packet routing device 7 routes each of the recovered packets, based on their respective destination addresses.

The aggregating function section 2 has a common-route packet extracting device 8, which extracts two or more packets having a common route at least in part of their routes to respective terminals, from a plurality of packets, based on extracted destination addresses thereof. An aggregate packet creating device 9 aggregates two or more packets having a common route at least in part of their routes to create an aggregate packet including information of each of the packets.

Figure 6:
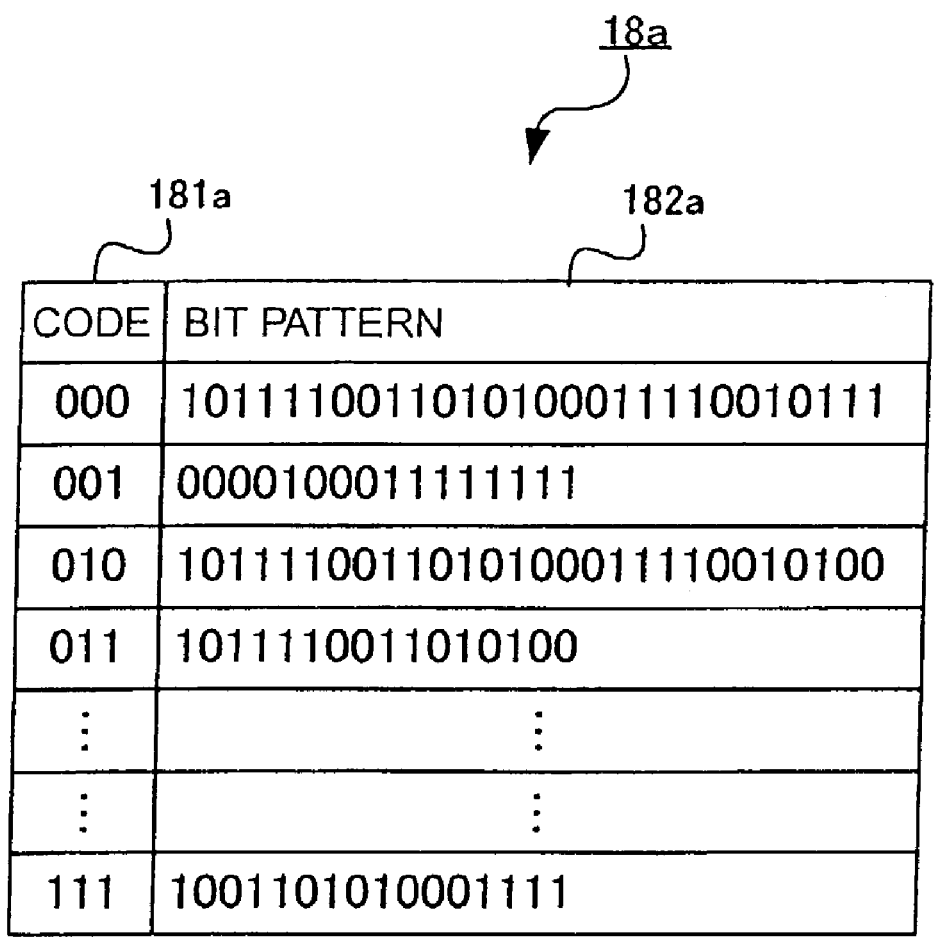
FIG. 6 is a diagram showing an example of data stored in a compression table.

An aggregate packet compressing device 18 compresses the aggregate packet by first and second packet compressing methods described later. The aggregate packet compressing device 18 has a table 18a for compression. The compression table 18a consists of a code area 181a and a bit pattern area 182a, as shown in FIG. 6. Stored in the code area 181a are 3-bit data (e.g., "000," "001," "010," . . . ) as codes. Data having arbitrary bit counts (e.g., "10111100110101000111110010111," "0000100011111111," . . . ) are stored as updatable bit patterns in the bit pattern area 182a. The codes are stored in unique correspondence to the bit patterns so that selection of a bit pattern results in determining a corresponding code.

A destination address giving device 10 gives the aggregate packet a destination address so that the destination address of the aggregate packet is an address of an adjacent router on the common route. An aggregate packet routing device 11 routes the aggregate packet, based on the destination address. An aggregate flag setting device 12 sets an aggregate flag indicating an aggregate packet, in the header information of the aggregate packet. A number-of-bits comparing device 13 compares the total number of bits of the two or more packets having the common route at least in part of the routes, with the number of bits of the aggregate packet. The aggregate packet routing device 11 herein routes the aggregate packet, based on the destination address thereof, only when the result of the comparison between the numbers of bits is that the number of bits of the aggregate packet is smaller than the total number of bits of the two or more packets. In the first embodiment, targets of aggregation are only packets buffered on a transmission queue.

An input-output interface 14 has functions of reading a program recorded in a recording medium, such as CD-ROM or the like, and displaying data as an image. A program of a routing method according to the present embodiment can be read out of the recording medium through this input-output interface 14. A storage device 15 stores the program read through the input-output interface 14. The above components are connected to control buses 16a and 16b and are under control of a control device 17. The control device 17 executes the program stored in the storage device 15.

The router C and router H shown in FIG. 1 are provided with the aggregating function and the restoring function and thus have the restoring function section 1 and the aggregating function section 2 shown in FIG. 2. The router G and router D are provided with only the restoring function and thus have only the restoring function section 1. It is, however, noted that the router G and router D can also be provided with the aggregating function, of course.

The aggregating flow shown in FIG. 3 will be described below. First, it is determined whether there exist a plurality of IP packets on the transmission queue (step S1). Before a plurality of IP packets are put on the transmission queue, the determination at step S1 is repeated. When a plurality of IP packets exist on the transmission queue, reference is made to header information of arbitrary two IP packets in the queue (step S2). Here the arbitrary two IP packets will be referred to as IP packets ① and ②.

Next, it is determined whether the packets have a common route at least in part of their routes (step S3). Without any common route, the flow transfers to step S1; with a common route, the IP packets ① and ② are compressed and capsuled to create an aggregate packet (step S4). The aggregate packet thus created will be referred to as IP packet ③.

Supposing that packets I, II are aggregated at the router C and are transmitted via the router D to hosts E, F, the first and second packet compressing methods of the aggregate packet according to the present invention will be described below.

Figure 7:
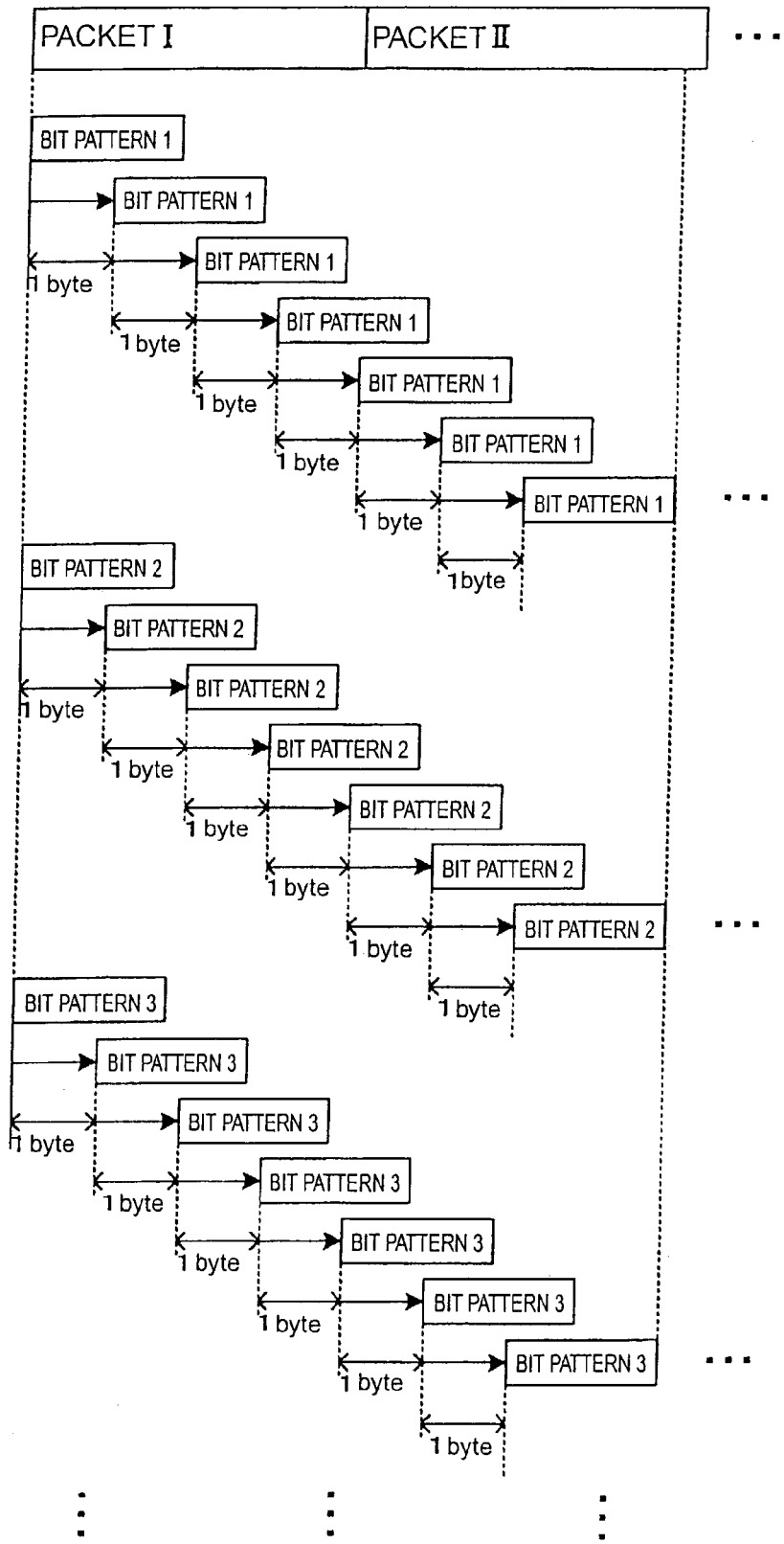
FIG. 7 is a diagram conceptually showing a comparing process of comparing packets I, II with bit patterns.

The first packet compressing method will be described first with reference to FIG. 6, FIG. 7, and FIG. 8. At the router C, as shown for example in FIG. 7, the packets I, II received from the hosts A, B, respectively, are compared with bit patterns 1, 2, 3, . . . acquired from the compression table 18a (cf. FIG. 6), thereby determining whether the packets I, II include the predetermined bit patterns.

Since the packets are comprised of bit strings of 8-bit (1 byte) units, the bit patterns are desirably compared while being shifted by one byte each, from the viewpoint of processing efficiency. A bit pattern, which is judged to be included in the packets I, II from the result of the comparison, is converted into a corresponding code.

FIG. 8 is a diagram conceptually showing a configuration of a packet compressed by the first packet compressing method. As shown in FIG. 8, the data part of the compressed aggregate packet V is composed of compression information V1 and compressed data V2. Furthermore, the compression information V1 consists of fields F1 to F9.

The field F1 has a fixed length a common to all the routers having the aggregating and restoring functions and stores the number of compressed portions existing in the data part of the aggregate packet V (e.g., 4). The field F2 has a fixed length b common to all the routers having the aggregating and restoring functions and stores a next field bit count c1 for declaring the number of bits of the field F3, in light of the fact that the number of bits of the next field is a variable length. The field F3 has a variable length c1 (e.g., 1 byte or 500 bytes) and stores a byte count d1 from the head of the compressed data V2 to code1 as a first compressed portion.

Likewise, the fields F4, F6, F8, similar to the field F2, store next field bit counts c2, c3, c4, respectively, for declaring the number of bits of the next field F5, F7, or F9. The fields F5, F7, F9, similar to the field F3, have variable lengths c2, c3, c4 and store byte counts d2, d3, d4, respectively, from the end of a compressed portion (e.g., code1) to a next compressed portion (e.g., code2).

The fields F5, F7, F9 may be configured to store byte counts from the head of the compressed data V2 to the respective compressed portions (e.g., code2, code3, and code4) as the field F3 was.

In either of these forms, the fields F3, F5, F7, F9 can be configured in fixed lengths, e.g., of 12 bits; in the case of the fixed lengths, the fields F2, F4, F6, F8 for declaring the bit counts do not always have to be provided.

The compressed data V2 is comprised of non-compressed portions of the byte counts d1, d2, d3, d4 and compressed portions code1, code2, code3, code4 as given 3-bit data, which are alternately arranged. Each of the data stored in F1 to F9 is used for specifying a bit string as a conversion target to a bit pattern among the compressed data V2 in the operation of uncompressing the data part of the aggregate packet V to recover the packets I, II.

Figure 9A:
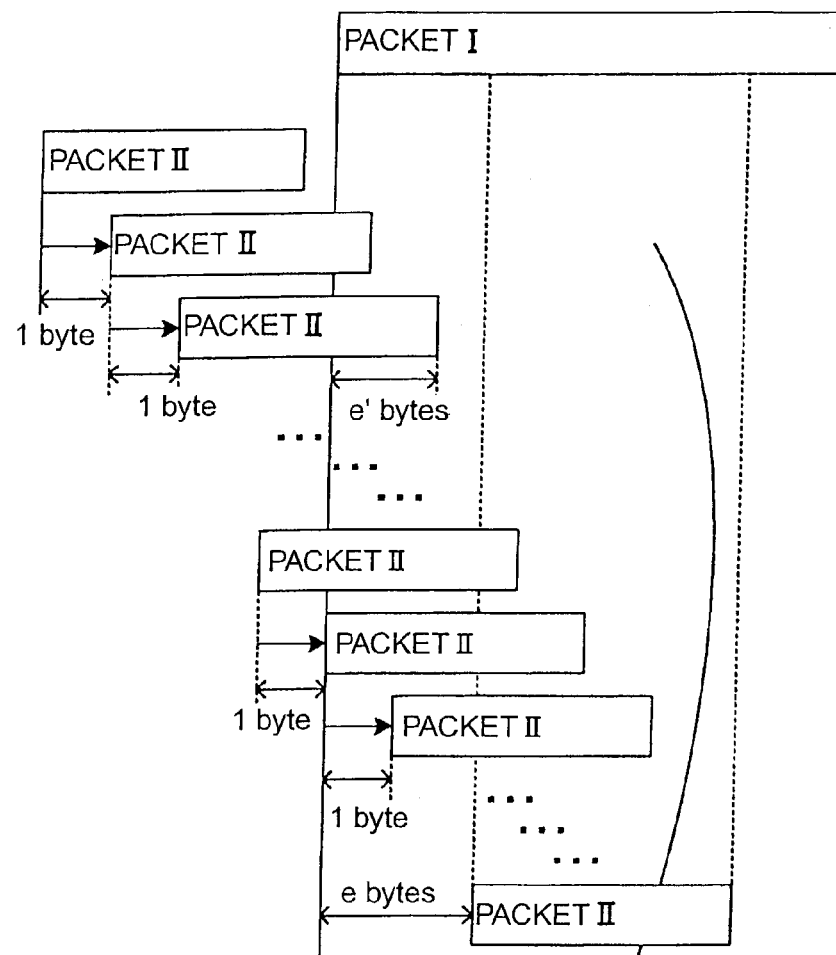
FIG. 9 is a diagram showing a process of searching for a common portion between packet I and packet II and an example of a bit string detected.
Figure 9B:
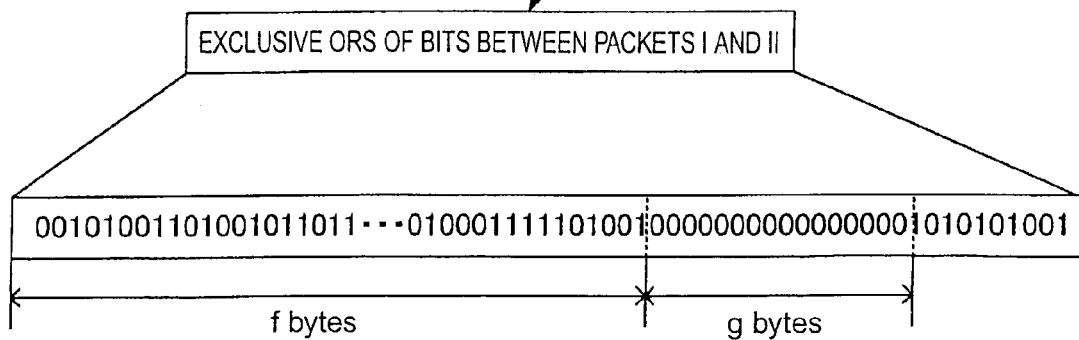

Subsequently, the second compressing method will be described with reference to FIG. 9, and FIG. 10. The router C detects from the packet II, a data part common to the packet I and the packet II received from the respective hosts A, B (which will be hereinafter referred to as a "common portion"). Specifically, as shown in FIG. 9, the common portion is searched for by moving the packet II by one byte each from the position where the leading portion of the packet I coincides with the end portion of the packet II, to the position where the end portion of the packet I coincides with the leading portion of the packet II. From the viewpoint of search efficiency, the packet to be moved is desirably a packet with the number of bits relatively smaller.

The search is carried out by performing the exclusive OR operation bit by bit between the packet I and the packet II. As a result of the research, as shown in FIG. 9, identical bits between the packet I and the packet II are expressed as "0" and different bits as "1." In the present embodiment, the search ends in finding a common portion with the bit count of g bytes at the position of f bytes from the leading portion of the packet II.

Specifically, the process of searching for the common bit string between the packet I and the packet II is carried out as follows. Let us suppose herein that the longer packet out of the two packets to be aggregated is the packet I and the shorter the packet II, that the packet length of the packet I is L1 bytes, and that a value at the k-th bit from the head of the packet I is B1(k−1) (i.e., the head bit is B1(0) and the last bit B1(L1*8−1)). It is also supposed that the packet length of the packet II is L2 bytes and that a value at the h-th bit from the head of the packet II is B2(h−1). Furthermore, it is supposed that when the head of the packet II is not a search target, the number of bytes in overlapping portions of the packet I and the packet II is e' and that when the head is a search target, the number of bytes from the head of the packet I to the head of the packet II is e.

For an integer e' between 0 inclusive and L2, the exclusive OR operation is performed between a bit string B1(0)-B1(8*e'−1) and a bit string B2(8*L2−8*e')-B2(8*L2−1). If the exclusive OR operation results in obtaining a bit string including a continuous 0 string of g bytes at f bytes from the head, a bit string B1(8*f)-B1(8*f+8*g−1) in the packet I and a bit string B2(8*L2−8*e'+8*f)-B2(8*L2−8*e'+8*f+8*g−1) in the packet II must be a common portion.

For an integer e between 0 inclusive and (L1-L2), the exclusive OR operation is performed between a bit string B1(8*e)-B1(8*e+8*L2−1) and a bit string B2(0)-B2(8*L2−1). When the exclusive OR operation results in obtaining a bit string including a continuous 0 string of g bytes at f bytes from the head, a bit string B1(8*e+8*f)-B1(8*e+8*f+8*g−1) in the packet I and a bit string B2(8*f)-B2(8*f+8*g−1) in the packet II must be a common portion.

For an integer e between (L1-L2) inclusive and L1, the exclusive OR operation is performed between a bit string B1(8*e)-B1(8*L1−1) and a bit string B2(0)-B2(8*L1−8*e−1). If the exclusive OR operation results in obtaining a bit string including a continuous 0 string of g bytes at f bytes from the head, a bit string B1(8*e+8*f)-B1(8*e+8*f+8*g−1) in the packet I and a bit string B2(8*f)-B2(8*f+8*g−1) in the packet II must be a common portion.

Figure 10:
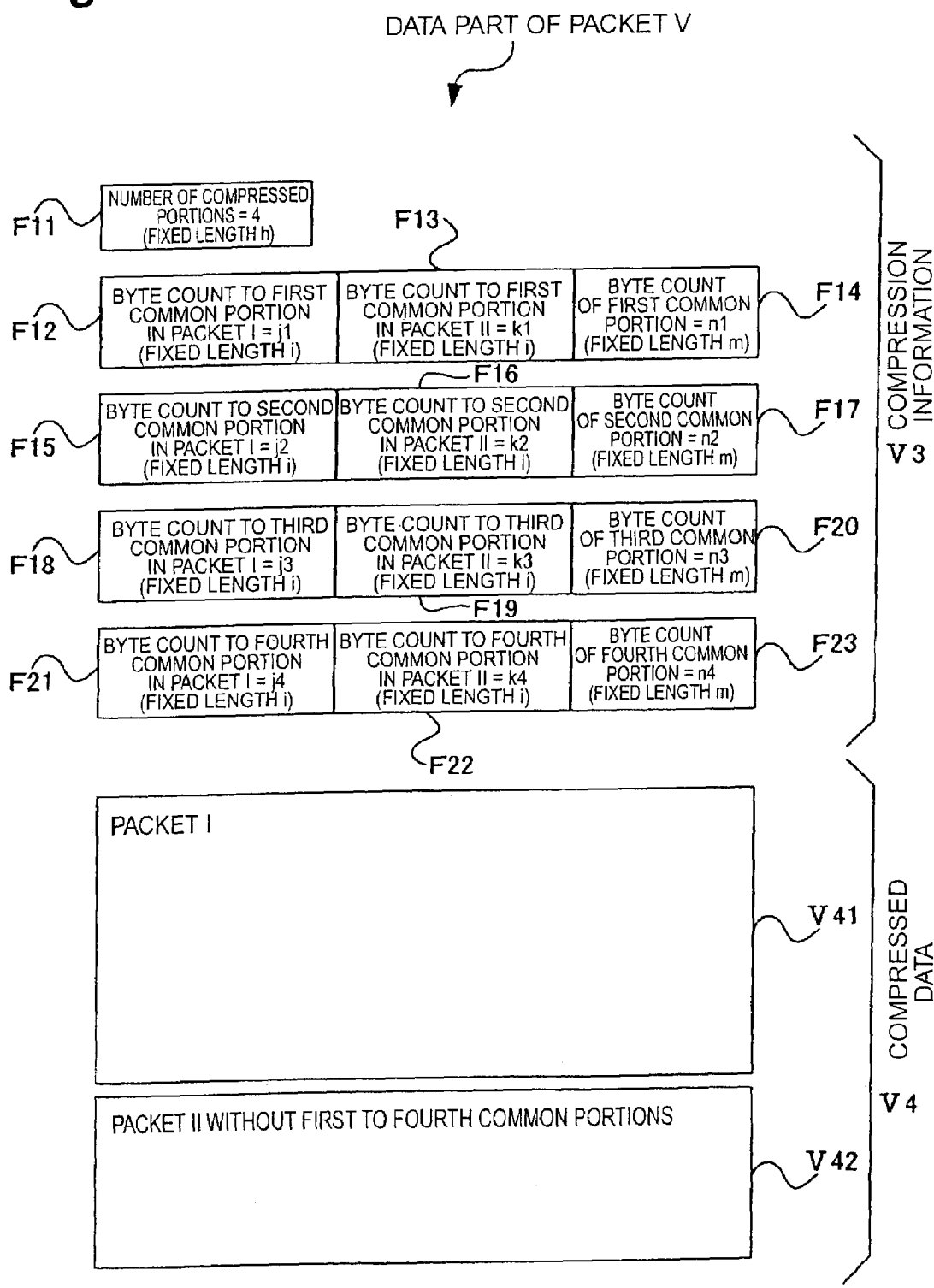
FIG. 10 is a conceptual diagram showing a configuration of a compressed packet by a second packet compressing method.

FIG. 10 is a diagram schematically showing a configuration of a packet compressed by the second packet compressing method. As shown in FIG. 10, the data part of the compressed aggregate packet V is composed of compression information V3 and compressed data V4. Furthermore, the compression information V3 consists of fields F11 to F23.

The field F11 has a fixed length h common to all the routers having the aggregating and restoring functions and stores the number of compressed portions existing in the data part of the aggregate packet V (e.g., 4). The field F12 has a fixed length i common to all the routers having the aggregating and restoring functions and stores a byte count j1 from the head to the first common portion in the packet I. Likewise, the field F13 has the fixed length i and stores a byte count k1 from the head to the first common portion in the packet II. The field F14 has a fixed length m common to all the routers having the aggregating and restoring functions and stores a byte count n1 indicating the number of bits of the first common portion.

Namely, a common portion of a byte count g is changed into compression information of a byte count (i×2+m) as a result of the compression process. Therefore, a condition for bringing about the compression effect by the second packet compressing method is that a bit string having at least the byte count g meeting the relation of g>i×2+m is selected as a common portion of a compression target. Namely, the larger a byte count obtained from subtraction of (i×2+m) bytes from the byte count of the common portion, the higher the effect of the compression process.

Similarly, the fields F15, F18, and F21 have the fixed length i common to all the routers having the aggregating and restoring functions and store byte counts j2, j3, and j4, respectively, from the head to the second, third, and fourth common portions in the packet I. Likewise, the fields F16, F19, and F22 have the fixed length i and store byte counts k2, k3, and k4, respectively, from the head to the second, third, and fourth common portions in the packet II. The fields F17, F20, and F23 have the fixed length m common to all the routers having the aggregating and restoring functions and store byte counts n2, n3, and n4, respectively, indicating the numbers of bits of the second, third, and fourth common portions.

The compressed data V4 consists of non-compressed part V41 and compressed part V42, as shown in FIG. 10. The non-compressed part V41 is equivalent to one packet (packet I) which is the same packet as that before the compression, and the compressed part V42 to the other packet (packet II) without the first to fourth common portions. Namely, the compressed part V42 is data corresponding to the difference between the packet I and the packet II. The data stored in F11 to F23 is used for specifying the positions where the respective common portions are to be inserted in the compressed data V4 in the operation of uncompressing the data part of the aggregate packet V to recover the packets I, II. The first and second compressing methods can be redundantly applied to a single packet. Packets to be aggregated may also be three or more packets, of course.

In either case of the above first and second compressing methods, the compression results in decreasing the number of bits of the data part of the aggregate packet V approximately by the number of bits resulting from subtraction of the compression information from the total number of bits of the compressed portions before the compression. However, if the number of bits decreased by the compression of the packets to be aggregated is small, the aggregation and compression can result in increasing the number of bits contrary. Therefore, the following process is executed to compare the total number of bits of the packets I, II with the total number of bits of the aggregate packet V.

Namely, the bits of the IP packets ①, ②, and ③ (equivalent to the foregoing packets I, II, and V, respectively) are counted, the count results thereof are defined as L1, L2, and L3, respectively, and L3 is compared with (L1+L2) (steps S5, S6). When the condition of L3≦(L1+L2) is not met as a result of the comparison, the IP packet ③ is discarded (step S7) and then the flow goes to step S1. When the condition of L3≦(L1+L2) is met on the other hand, the IP packets ① and ② are discarded and, instead thereof, the IP packet ③ is routed to an adjacent router on the common route (step S8).

The restoring flow shown in FIG. 4 will be described below. When an IP packet is received (step T1), it is determined whether the received IP packet includes an aggregate flag (step T2). Without the aggregate flag, the normal routing is carried out (step T3). With the aggregate flag on the other hand, the packet is decapsuled (or decomposed) to recover the original IP packets once (step T4).

For restoring a packet compressed by the first packet compressing method, it is necessary to perform an uncompressing process as a preliminary process; in the uncompressing operation, the router D converts compressed portions (code1 to code4 in FIG. 8) in the compressed data into their original bit patterns with reference to the compression table 18a. In an uncompressing process carried out prior to the restoring operation of a packet compressed by the second packet compressing method, the router D inserts the data of common portions picked out in the compressing operation, into the compressed data.

Then reference is made to the destinations of the respective original packets. As a result of the reference, it is determined whether the packets have a common route in their routes (step T5). When they have no common route, each of the recovered packets is normally routed and the aggregate packet is discarded (step T6). On the other hand, when the packets have a common route in their routes, only the header of the aggregate packet is changed so that the destination thereof is an adjacent node (router) on the common route (step T7). Here the data part is copied. The aggregate packet created at step T7 is normally routed and each of the recovered packets is discarded (step T8).

The presence of the aggregate flag makes it feasible to readily and quickly determine whether a packet is an aggregate packet.

A specific routing method in the first embodiment will be described below with reference to FIG. 1 and FIG. 5. As shown in FIG. 5, the IP packet format includes a source's IP address at the head and a destination IP address subsequent thereto. Thereafter, an aggregate flag is set as occasion may demand, and the data part is provided in the last place. In FIG. 1, the host A sends the IP packet I to the host E. In the IP packet I, as shown in FIG. 5, the source is the host A and the destination the host E. The host B sends the IP packet II to the host F. In the IP packet II, the source is the host B and the destination the host F.

Figure 3:
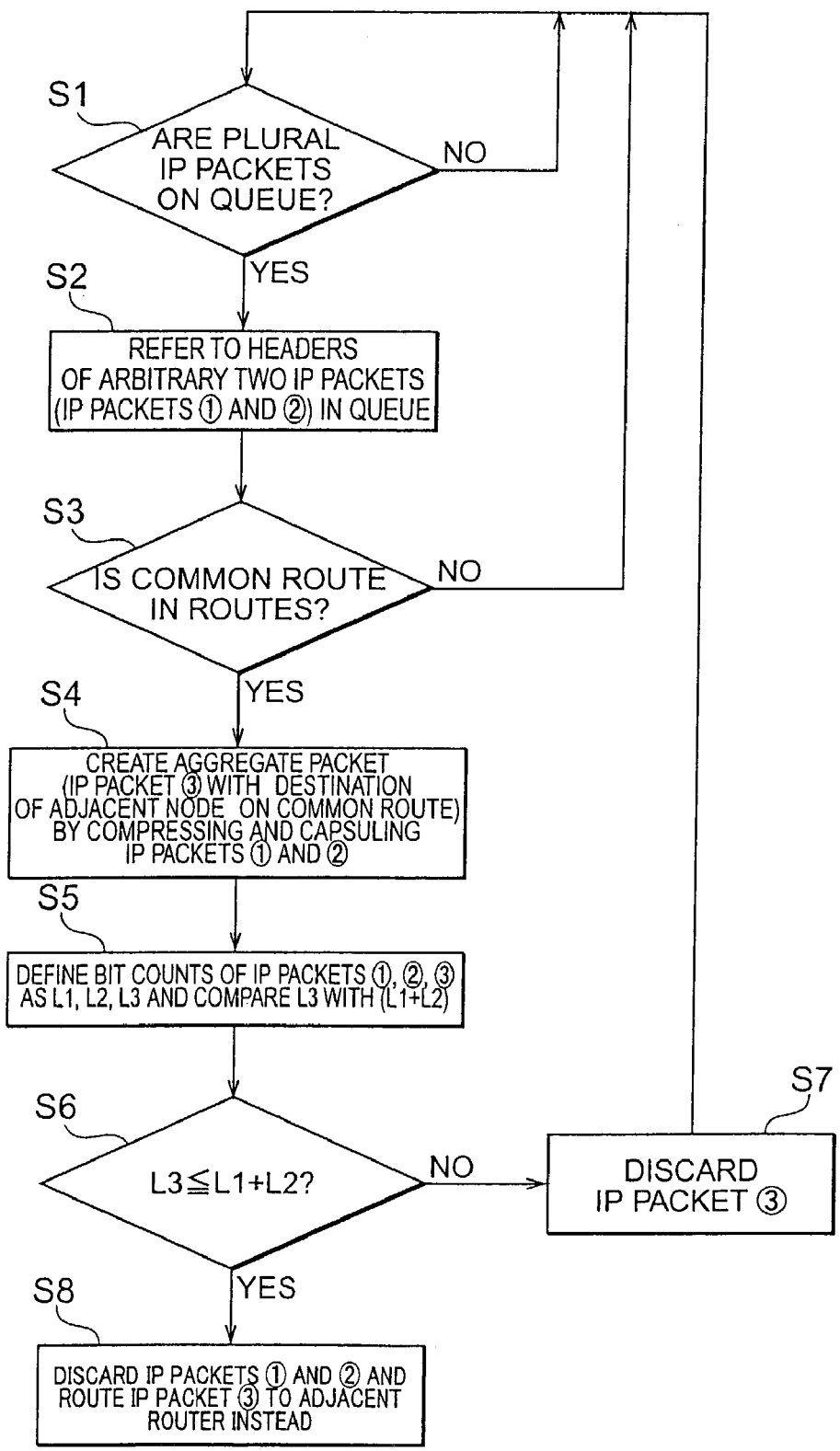
FIG. 3 is a flowchart for carrying out the aggregating function.

Receiving the packet I and the packet II, the router C executes the aggregating flow shown in FIG. 3, to create the aggregate packet III by its aggregating function. In the IP packet III, as shown in FIG. 5, the source is the router C, the destination the router G, and the aggregate flag is set. The data part stores the packet I and the difference between the packets I and II, using the differential compression technology adopting interframe correlation coding in moving picture. Since the number of bits of the packet III is smaller than the number of bits of the packets I, II, the packet III is routed.

Figure 4:
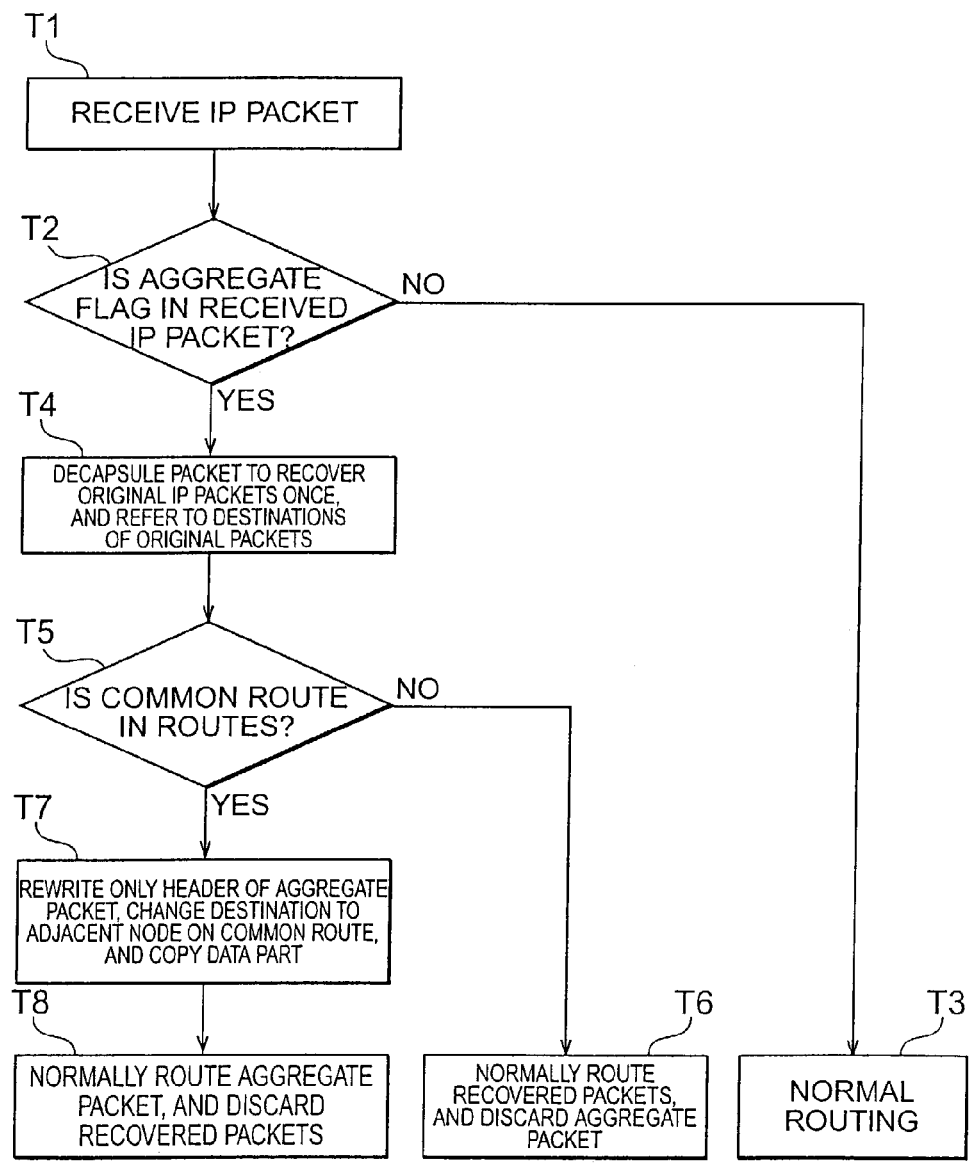
FIG. 4 is a flowchart for carrying out the restoring function.

Receiving the aggregate packet III, the router G at a relay point executes the restoring flow shown in FIG. 4. Since it is determined therein that the recovered original packets also have a common route hereinafter, the recovered packets are discarded. The aggregate packet is routed to an adjacent router H on the common route. This aggregate packet has the structure shown in FIG. 5. Namely, the source is the router G, the destination the router H, and the aggregate flag is set. The data part stores the packet I, and the difference between the packets I and II.

The router H at a relay point operates in much the same manner as the router G, and sends the aggregate packet V to the router D. In the aggregate packet V, as shown in FIG. 5, the source is the router H, the destination the router D, and the aggregate flag is set; and the data part stores the packet I, and the difference between the packets I and II.

Receiving the aggregate packet V, the router D executes the restoring flow shown in FIG. 4. As shown in FIG. 4, for example, since the aggregate flag is set in the aggregate packet V, the restoring operation is carried out to recover the packet VI (the same data configuration as the packet I) and the packet VII (the same data configuration as the packet II). Since the packet VI and the packet VII have no common route any longer, the aggregate packet is discarded and the recovered packets are routed. It is also possible that a recovered packet is again aggregated with another packet on the transmission queue as a result of execution of the aggregating flow. Then the IP packets VI, VII are sent to the host E and to the host F, respectively.

In the packet communication system of the first embodiment, as described above, when two or more packets have a common route at least in part of the routes to their respective terminal addresses, the information pieces of the packets are aggregated to create one aggregate packet, which can decrease the total number of packets transmitted on the network. The decrease in the total number of packets results in decreasing the number of references to the routing table, reducing the processing load, and increasing the processing speed. As a result, it becomes feasible to achieve the efficient utilization of the network resources. Furthermore, it is determined whether the aggregate packet should be relayed in that state to the next link, or the two or more original packets should be recovered from the aggregate packet and be relayed. When the result of the determination is that the packets have a common route at least in part of their routes, the destination address of the aggregate packet is rewritten so that the destination address of the aggregate packet is an address of an adjacent router on the common route, and the aggregate packet is routed, which can reduce the total number of packets transmitted on the network.

The above described the case where the receivers of the aggregate packet V were routers, with reference to FIG. 1 to FIG. 10, but the present invention can also be applied to the case where the receivers of the aggregate packet V are mobile terminals. The following will describe a process of creating the aggregate packet V from the packets I, II, using Mobile IPv6 (Internet Protocol Version 6), with reference to FIG. 1, FIG. 11A, FIG. 11B, FIG. 12A, and FIG. 12B. In the description herein, it is supposed that the aggregate packet V of the packets I, II is sent from the hosts A, B via the router C to a mobile host M (not shown).

Figure 11A:
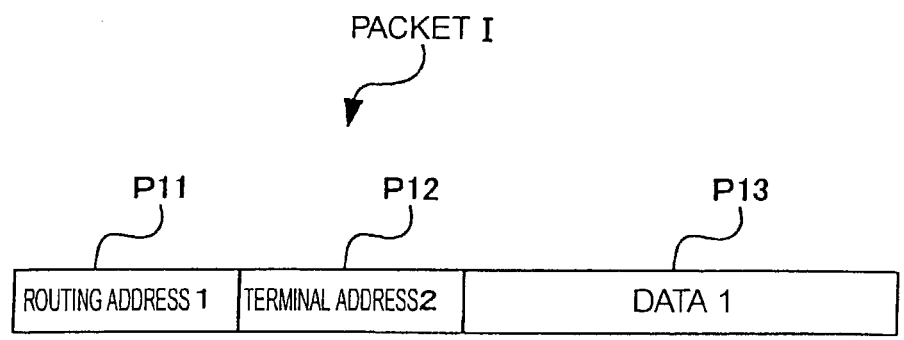
FIG. 11A is a diagram showing an example of a configuration of packet I before passing via a route.
Figure 11B:
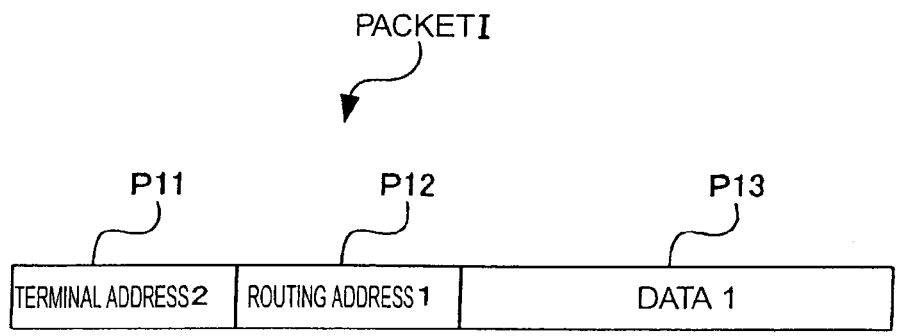
FIG. 11B is a diagram showing an example of a configuration of packet I after passing via a route.

As a premise, the packet I is composed of a basic IPv6 header P11, a routing header P12, and a data area P13, as shown in FIG. 11A. An IP address (Care of address) temporarily used at a foreign subnet by the mobile terminal is stored as a routing address 1 in the basic IPv6 header P11. An address specific to the mobile host M to receive the packet I (Home address) is stored as a terminal address 2 in the routing header P12. Here the terminal does not always have to be a final arriving point of the packet, but it includes a terminal point of a common route between arbitrary nodes or hosts. Data 1 as real data is stored in the data area P13.

Figure 12A:
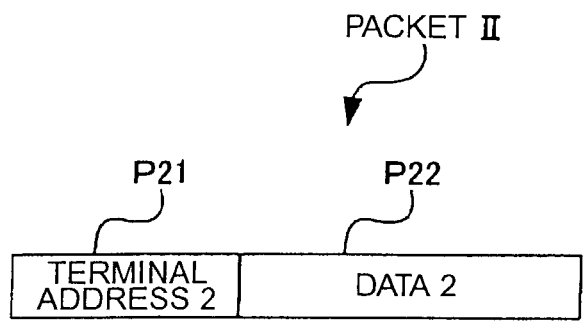
FIG. 12A is a diagram showing an example of a configuration of packet II.

The packet II is composed of a basic IPv6 header P21 and a data area P22, as shown in FIG. 12A. An address specific to the mobile host M to receive the packet II is stored as a terminal address 2 in the basic IPv6 header P21. Data 2 as real data is stored in the data area P22.

Figure 12B:
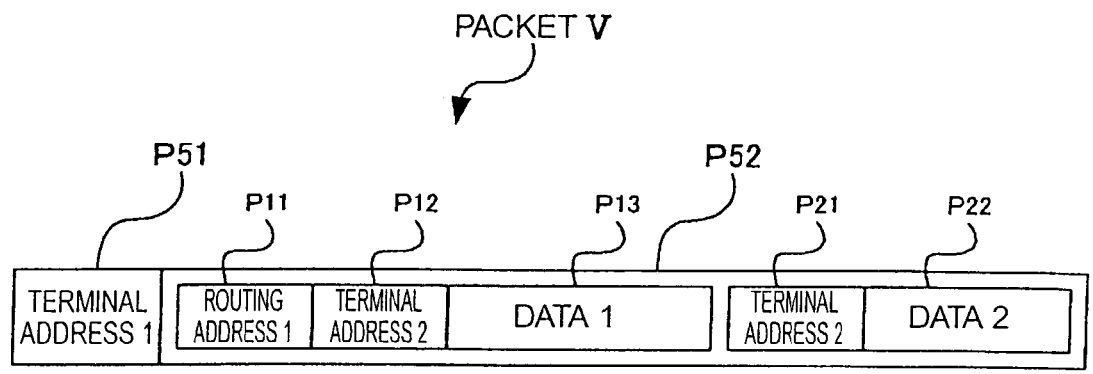
FIG. 12B is a diagram showing an example of a configuration of aggregate packet V after aggregation.

When the packet I and the packet II both arrive at the router C, the router C aggregates the packets I, II and adds a terminal address 1 indicating the present position of the mobile host M to create the aggregate packet V. The aggregate packet V stores the terminal address 1 as a routing destination in the basic IPv6 header P51, as shown in FIG. 12B. The packet I and the packet II are packed in the data area P52.

When the aggregate packet V arrives at the node indicated by the terminal address 1 (the mobile host M), the mobile host M creates (or recovers) the packets I, II from the aggregate packet V. At this time, the terminal address 1 and the terminal address 2 both are is the address of the mobile host M. Accordingly, the mobile host M is able to receive the packets I, II having the terminal address 2 at the head, as well as the aggregate packet V having the terminal address 1 at the head. This makes it feasible to perform more efficient packet transmission while avoiding triangle routes, as compared with the case where the packet II is once capsuled at another node (Home Agent) and is transferred to the mobile host M.

Second Embodiment

Figure 13:
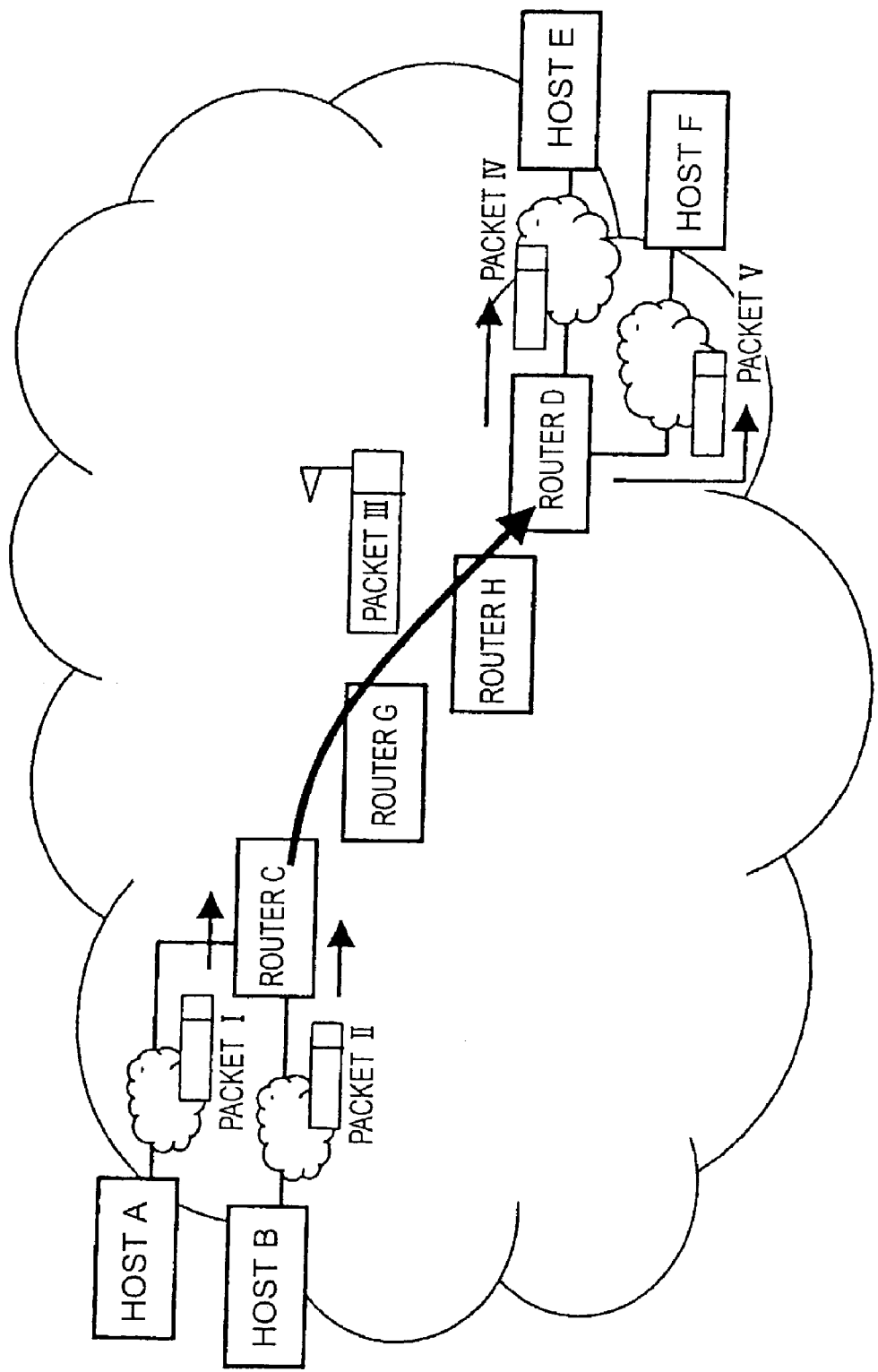
FIG. 13 is a diagram schematically showing a packet communication system as a second embodiment of the present invention.

FIG. 13 is a diagram schematically showing a packet communication system as a second embodiment of the present invention. In the second embodiment, two or more IP packets are capsuled together under one IP header to create an aggregate packet. The system is configured on the premise that the routing protocols such as OSPF and others are active on the network and that the routers having the aggregating function preliminarily know the network topology and which node has the restoring function. It is also possible to manually set the network topology and the nodes with the restoring function, for each of the routers having the aggregating function. The router G in the network has neither the restoring function nor the aggregating function. The router H has only the restoring function by decapsuling. The router C and the router D have both the aggregating function by capsuling and the restoring function by decapsuling. Here the aggregating function is a function of executing the processing shown in the flowchart of FIG. 15, and the restoring function a function of executing the processing shown in the flowchart of FIG. 16. The router C and the router D having the both functions execute the aggregating flow on the transmission queue in parallel with execution of the restoring flow for each of received packets.

Figure 14:
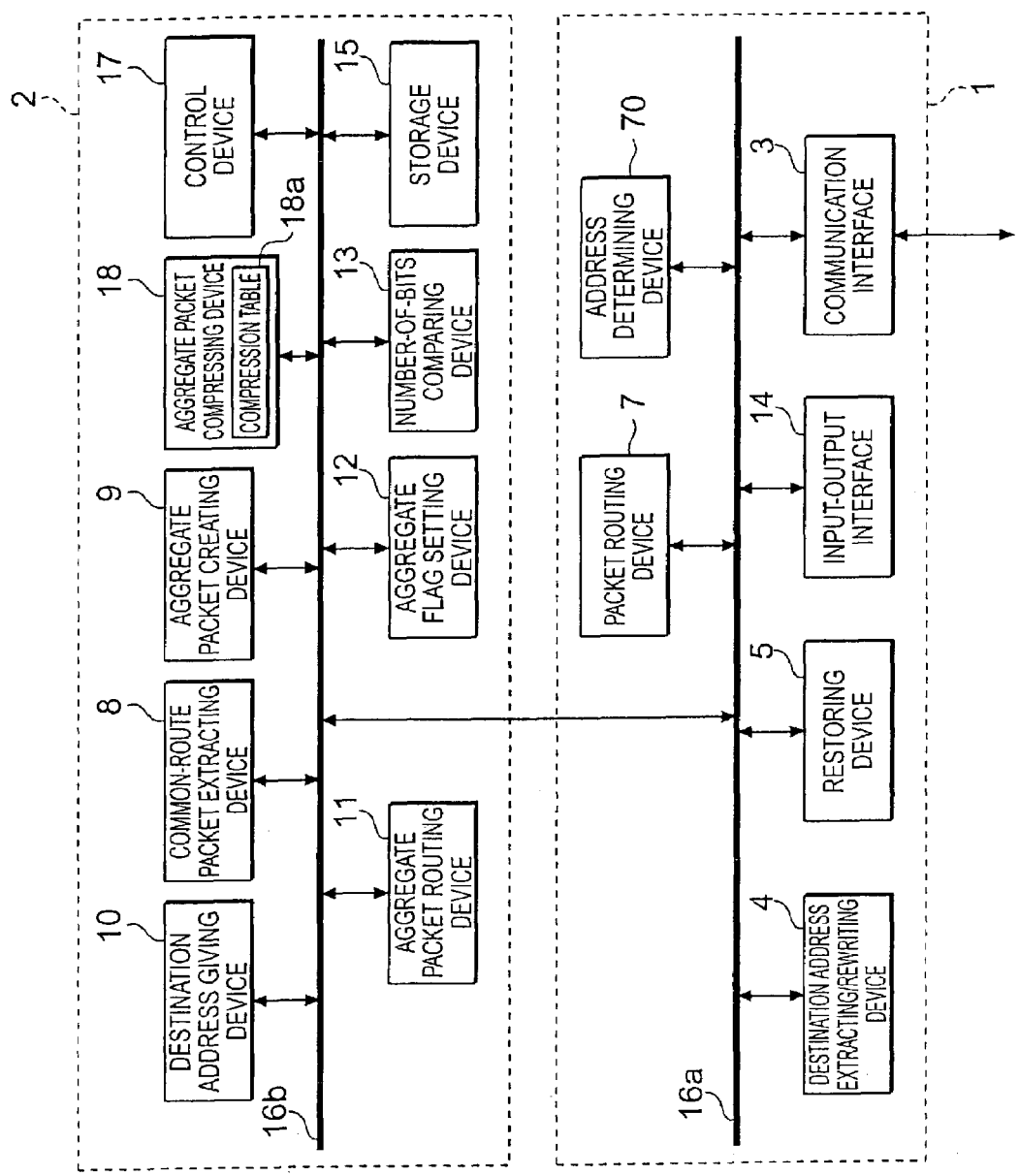
FIG. 14 is a block diagram showing a schematic configuration of a router having the aggregating function and the restoring function.

FIG. 14 is a block diagram showing a schematic configuration of a router having the aggregating function and the restoring function in the second embodiment. The present embodiment is different from the first embodiment in that the router is provided with an address determining device 70 for determining whether a destination address extracted agrees with an address of its own router, instead of the determining device 6 in the restoring function section 1. The destination address giving device 10 gives an aggregate packet a destination address so that the destination address of the aggregate packet is an address of a predetermined node having the function of recovering the two or more original packets from the aggregate packet. This makes it feasible to designate a restoring node. The other components are similar to those in the first embodiment, and thus the description thereof is omitted herein.

Since the router C and the router D shown in FIG. 13 are provided with the aggregating function and the restoring function, they have the restoring function section 1 and the aggregating function section 2 shown in FIG. 14. Since the router H is provided with only the restoring function, it has only the restoring function section 1.

The aggregating flow shown in FIG. 15 will be described below. First, the router C determines whether there exist a plurality of IP packets on the transmission queue (step R1). Before the transmission queue comes to include a plurality of IP packets, the determination at step R1 is repeated. On the other hand, when the transmission queue includes a plurality of IP packets, reference is made to headers of arbitrary two IP packets in the queue (step R2). The arbitrary two IP packets will be referred to as IP packets ① and ②, respectively.

It is then determined whether the packets have a common route in their routes (step R3). When the packets have no common route in their routes, the flow transfers to step R1; when the packets have a common route in their routes, a search is performed for the most distant node among the restoring nodes present on the common route (step R4). The most distant router among the restoring nodes present on the common route will be referred to hereinafter as an FC (Farthest Common) router. The router C sends an IP packet with its destination of the router D being an FC router, so as to skip the flag reference process and the restoring process at the routers G, H, thereby increasing the processing efficiency.

After the search at step R4, it is determined whether there is an FC router (step R5). If no FC router exists, the flow transfers to step R1. If there is an FC router, an aggregate packet is created by compressing and capsuling the IP packets ① and ② (step R6). This aggregate packet is defined as an IP packet ③ and the destination thereof is the FC router. The compression for the aggregate packet is implemented by applying the first or second packet compressing method described referring to FIG. 6 to FIG. 10, or the both.

Then the bit counts of the IP packets ①, ②, and ③ are defined as L1, L2, and L3, respectively, and L3 is compared with (L1+L2) (step R7). When the comparison results in not meeting the condition of L3≦(L1+L2), the IP packet ③ is discarded (step R9) and the flow transfers to step R1. On the other hand, when the condition of L3≦(L1+L2) is met, the IP packets ① and ② are discarded and, instead thereof, the IP packet ③ is routed to the FC router (step R10)

The restoring flow shown in FIG. 16 will be described below. When an IP packet is received (step ST1), it is determined whether the received IP packet includes an aggregate flag (step ST2). Without the aggregate flag, the normal routing is carried out (step ST6). With the aggregate flag on the other hand, it is determined whether the destination of the IP packet is its own router (step ST3). When the destination of the IP packet is not its own router, the normal routing is performed (step ST6). When the destination of the IP packet is its own router, the packet is decapsuled (or decomposed) to recover the original IP packets (step ST4). It is then determined whether each recovered IP packet is one with an aggregate flag (step ST5). When the IP packet includes no aggregate flag, the normal routing is performed (step ST6). On the other hand, when the IP packet includes the aggregate flag, the flow goes to step ST3.

A specific routing process in the second embodiment will be described below with reference to FIG. 13 and FIG. 17. As shown in FIG. 17, the IP packet format has a source's IP address at the head and a destination IP address subsequent thereto. Thereafter, an aggregate flag is set as occasion may demand, and the data portion is provided in the last place. In FIG. 13, the host A sends the IP packet I to the host E. In the IP packet I, as shown in FIG. 17, the source is the host A and the destination the host E. The host B sends the IP packet II to the host F. In the IP packet II, the source is the host B and the destination the host F.

Figure 15:
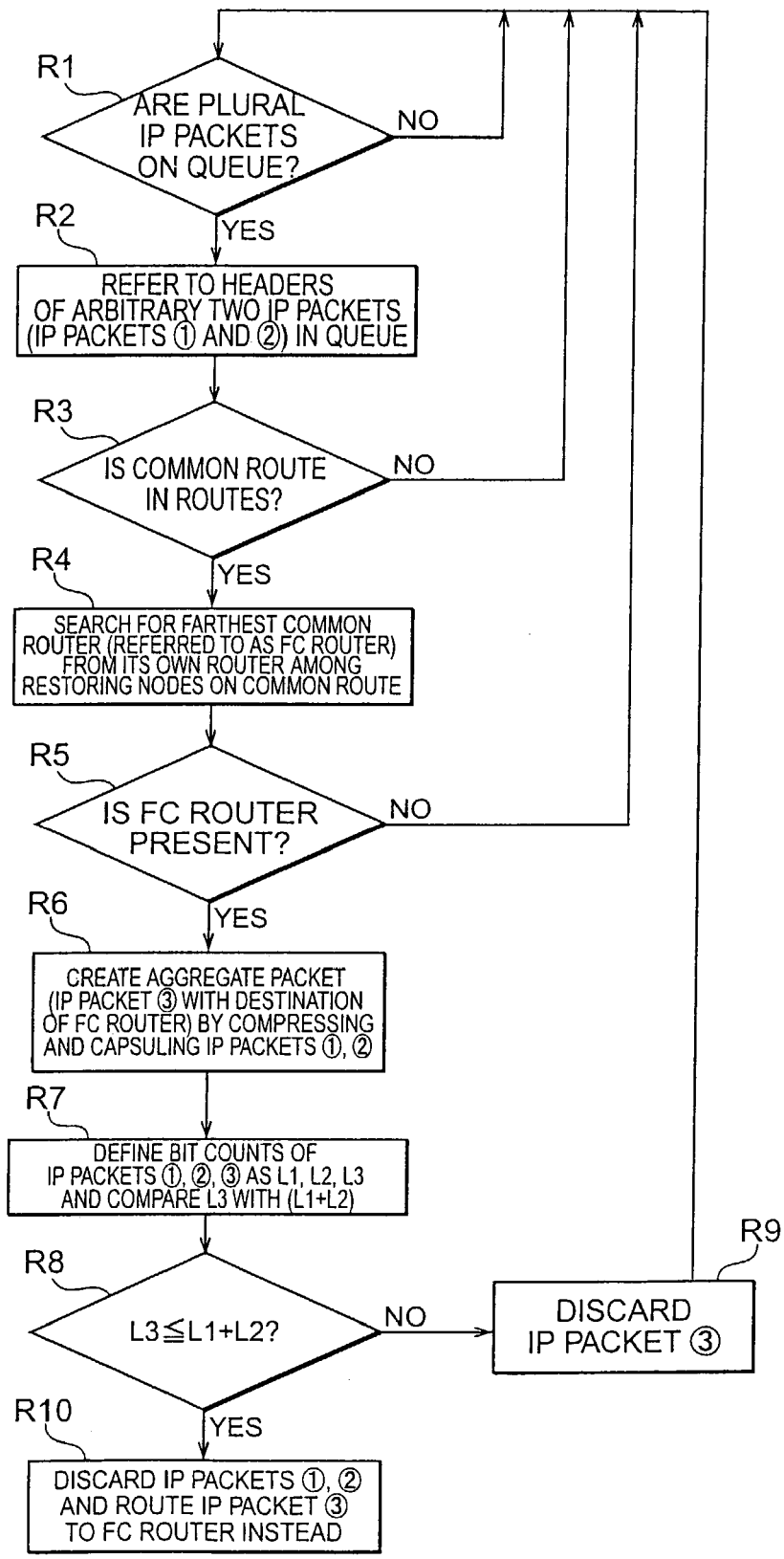
FIG. 15 is a flowchart for carrying out the aggregating function.

Receiving the packet I and the packet II, the router C executes the aggregating flow shown in FIG. 15, to create an aggregate packet III by its aggregating function. As shown in FIG. 17, the data part stores the packet I, and the difference between the packets I and II, using the differential compression technology adopting the interframe correlation coding in moving picture. In the header part the aggregate flag is set and the router D being the FC router is designated as a destination node of the aggregate packet. Since the number of bits of the packet III is smaller than that of the packets I, II, the packet III is routed.

This results in restoring the aggregate packet only at the designated node. Namely, the nodes other than the designated node perform the normal routing, so as to avoid performing dispensable restoring processing, whereby the repeating processing can be made more efficient.

The router G at a relay point does not have the restoring function and thus performs the normal routing of this packet III. This router G without the restoring function can never be a terminal of the packet capsuled by the router C.

Receiving the aggregate packet III, the router H at a relay point executes the restoring flow. According to FIG. 16, though the aggregate flag is set in the packet III, the normal routing is carried out eventually, because the destination address is not the router G.

Figure 16:
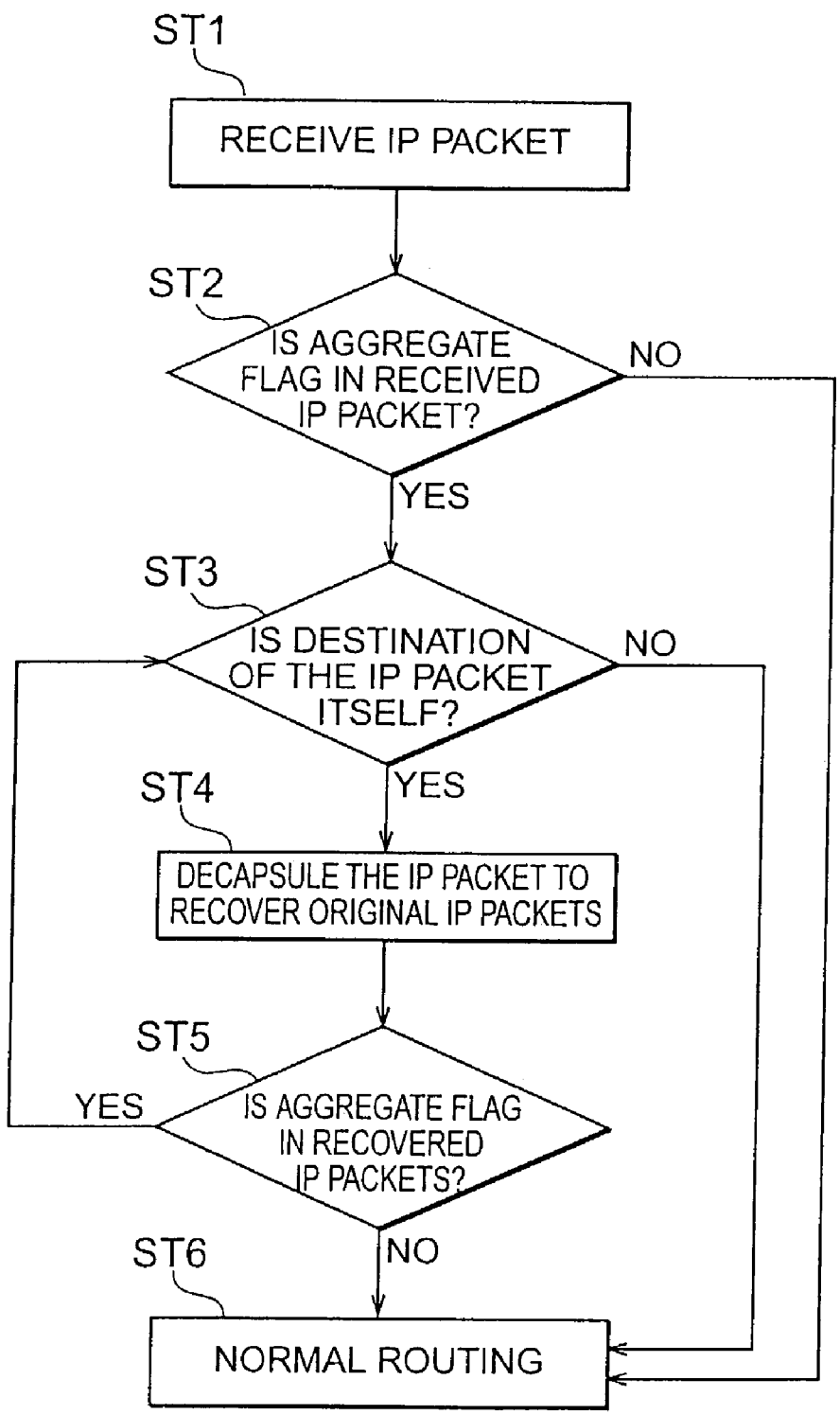
FIG. 16 is a flowchart for carrying out the restoring function.

Receiving the aggregate packet III, the router D executes the restoring flow shown in FIG. 16. Since the aggregate flag is set in the packet III and the destination address is the router D (its own router), the restoring operation is carried out to recover the packet IV (the same data configuration as the packet I) and the packet V (the same data configuration as the packet II), as shown in FIG. 16. Here each of the packet IV and the aggregate packet V can be again aggregated with another packet. Then the IP packets IV, V are transmitted to the host E and to the host F, respectively.

As described above, the packet communication system in the second embodiment is configured to aggregate two or more packets to replace them with a single aggregate packet and further compress the aggregate packet, which decreases the total number of packets and the total amount of information transmitted on the network, thereby achieving the efficient utilization of the network resources.

Third Embodiment

Figure 18:
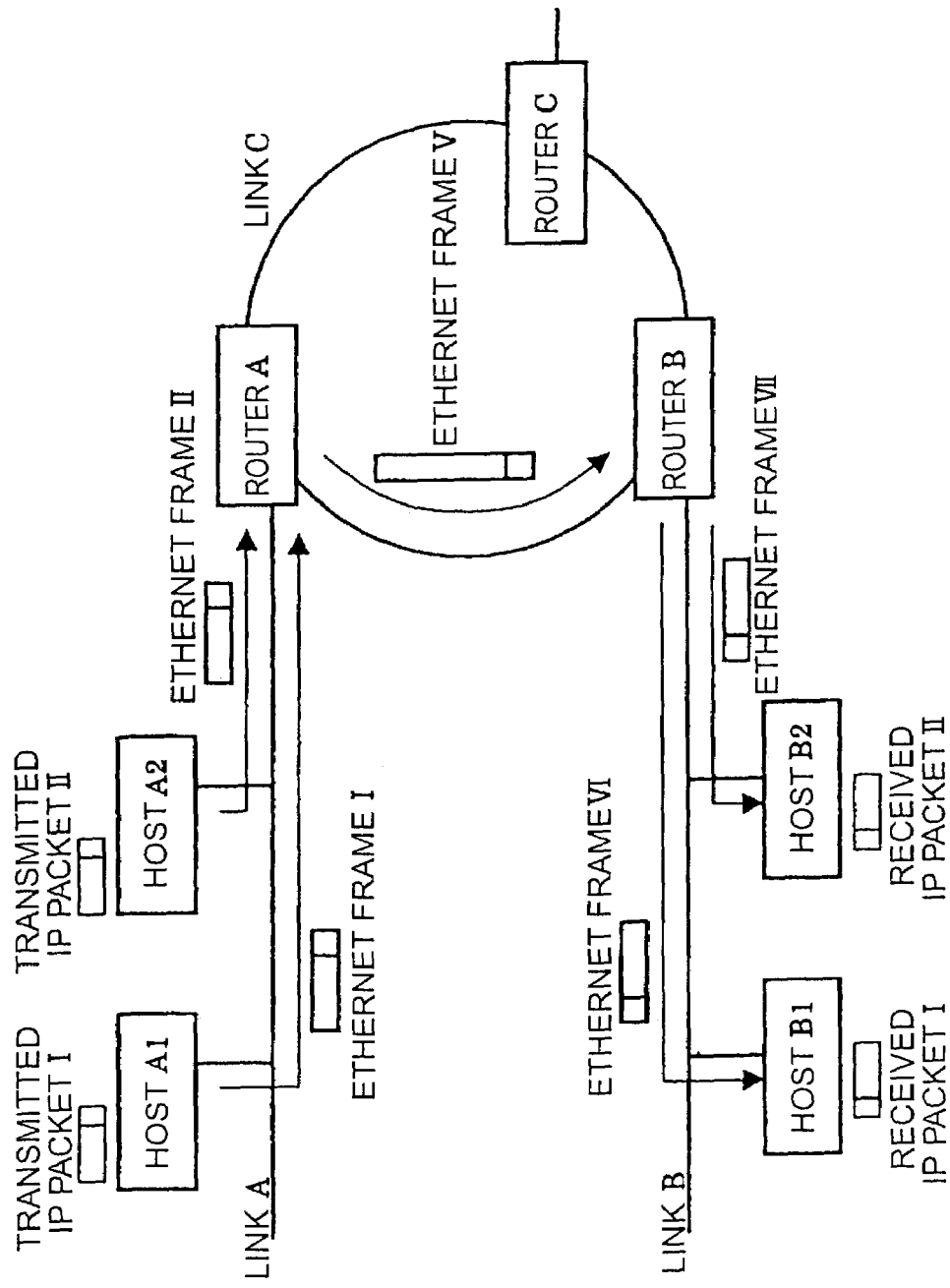
FIG. 18 is a diagram schematically showing a packet communication system as a third embodiment of the present invention.

FIG. 18 is a diagram schematically showing a packet communication system as a third embodiment of the present invention. In the above-described first embodiment and second embodiment, the aggregate IP packet was created by capsuling of two IP packets, but it is also possible to create an aggregate Ethernet (registered trademark) frame from two IP packets without use of the capsuling technology. In the third embodiment, an aggregate Ethernet frame is created from two IP packets. The system is based on the premise that the routing protocols are used on the network, as in the conventional Internet.

Here the routers A and B have the aggregating function of an Ethernet level and all the routers on the network have the restoring function. The aggregating function of the Ethernet level herein is a function of executing the processing shown in the flowchart of FIG. 19. The restoring function of the Ethernet level is a function of identifying an aggregate flag of an aggregate Ethernet frame and extracting two IP packets from the frame. A node having these two functions is configured to execute the restoring function for each of received Ethernet frames and carry out the aggregating flow on the transmission queue in parallel therewith.

Figure 19:
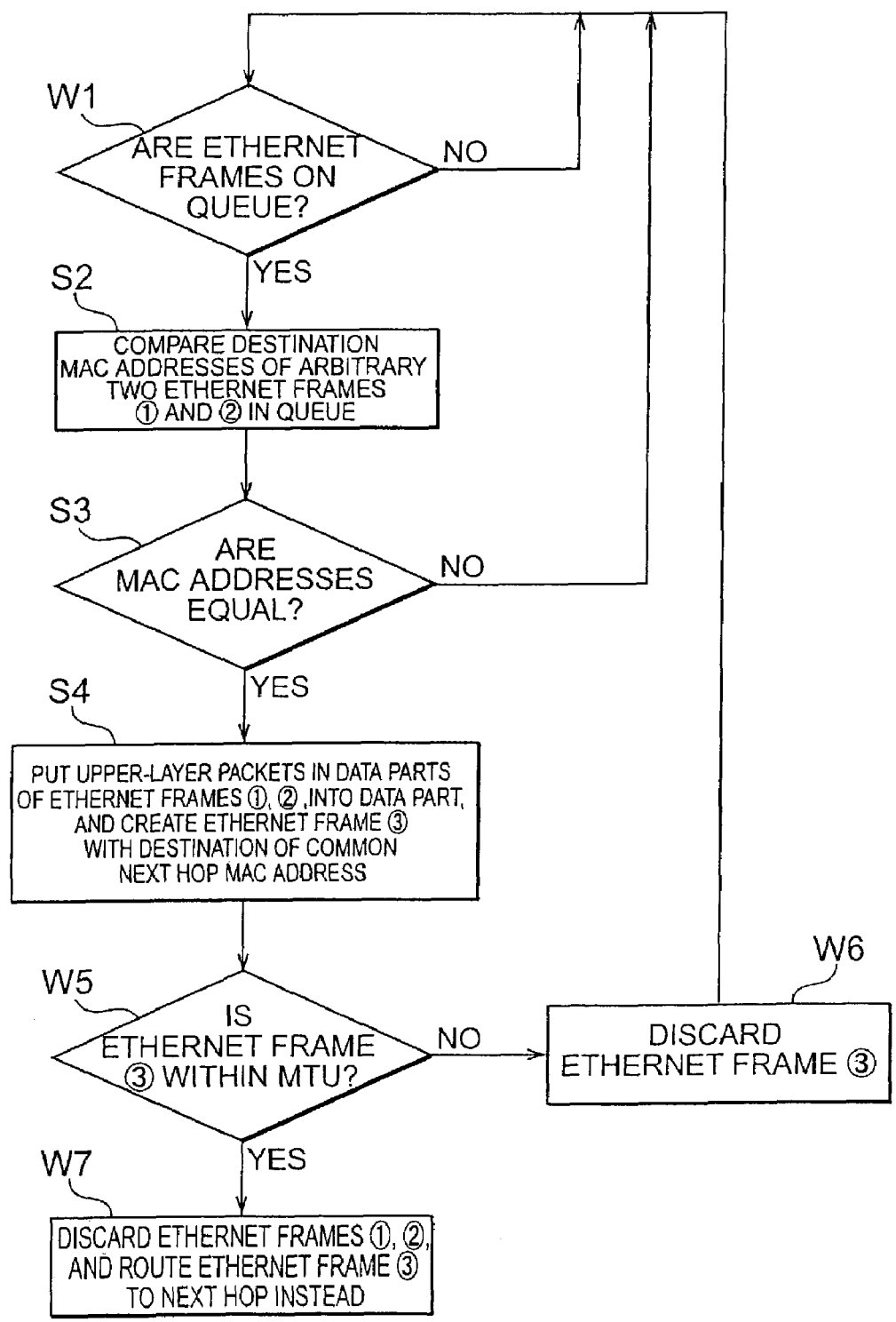
FIG. 19 is a flowchart showing the aggregating function of the Ethernet (registered trademark) level.

The aggregating flow shown in FIG. 19 will be described below. It is first determined whether there exist a plurality of Ethernet frames on the transmission queue (step W1) Before the transmission queue comes to include a plurality of Ethernet frames, the determination at step W1 is repeated. On the other hand, when the transmission queue includes a plurality of Ethernet frames, a comparison is made between destination MAC addresses of arbitrary two Ethernet frames ① and ② in the queue (step W2). It is then determined whether the MAC addresses agree with each other (step W3). When they disagree, the flow goes to step W1. When the MAC addresses agree with each other on the other hand, an Ethernet frame ③ is created in a configuration wherein two upper-layer packets in the data parts of the Ethernet frames ① and ② both are stored in its data part and a common next hop MAC address is designated as a destination (step W4). It is next determined whether the Ethernet frame ③ is within MTU (Maximum Transmission Unit) (step W5). When it is over MTU, the Ethernet frame ③ is discarded (step W6) and the flow transfers to step W1. When the Ethernet frame ③ is within MTU at step W5 on the other hand, the Ethernet frames ① and ② are discarded and, instead thereof, the Ethernet frame ③ is routed to the next hop (step W7).

A specific routing process in the third embodiment will be described below with reference to FIG. 18 and FIG. 20. As shown in FIG. 20, the format of the Ethernet frame includes a destination MAC address at the head and a source's MAC address subsequent thereto. Thereafter, an aggregate flag is set according to necessity, and the data part is provided in the last place. The data part stores a source's IP address and a destination IP address in the order stated.

Let us suppose that a host A1 on an Ethernet link A sends an Ethernet frame I with the data part including an IP packet I sent to a host B1 on an Ethernet link B, and a host A2 on the link A sends an Ethernet frame II with the data part including an IP packet II sent to a host B2 on the link B. Receiving the two Ethernet frames, the router A once creates an Ethernet frame III for sending the IP packet I to the router B and an Ethernet frame IV for sending the IP packet II to the router B.

When these two frames are created on the queue, the router A executes the aggregating flow. Namely, the router A creates an Ethernet header with the destination of the router B which is a common destination address, and stores the IP packet I and the IP packet II in the data part. An Ethernet frame V thus created is shown in FIG. 20. The Ethernet frame V is relayed through an Ethernet link C to the router B. On this occasion, in the Ethernet frame format there exists a flag set for an aggregate packet in the Ethernet header, and an aggregate flag is thus present, because the Ethernet frame V is an "aggregate packet."

Receiving the Ethernet frame V, the router B identifies the aggregate flag and extracts the two IP packet I and IP packet II from the data part. Subsequently, the router B places an Ethernet frame VI with the host B1 as a destination MAC address and an Ethernet frame VII with the host B2 as a destination MAC address on the queue. The aggregating flow can also be executed on this queue, but the aggregation is not carried out in fact, because the destinations of the Ethernet frames disagree.

The IP packets I, II are carried by the respective Ethernet frames VI, VII to be delivered to the hosts B1, B2.

As described above, the packet communication system in the third embodiment is configured to perform the aggregation of Ethernet frames, whereby it is feasible to reduce the overhead and achieve maximum utilization of MTU of each link.

In the last place, the following will describe a program for implementing the routing technology according to the present invention and a computer-readable recording medium (which will be referred to hereinafter simply as a "recording medium") in which the program is recorded. The recording medium is a medium capable of inducing state changes of energy such as magnetism, light, electricity, or the like according to the description contents of the program against a reading device provided in the hardware resources of general-purpose computers and others and transmitting the description contents of the program to the reading device in the form of signals corresponding to the state changes. Such recording media can be, for example, those detachably mounted on computers, (including mobile computers) like IC cards, magnetic disks, optical disks, and magnetooptical disks, and can also be HD (Hard Disk) fixedly built in computers, nonvolatile semiconductor memories such as firmware or the like integrally secured in the computers, and so on.

The above program may be configured so that part or the whole thereof is received by a router or a node according to the present invention through transmission media such as a communication line and others from another device and is recorded therein. Contrary, the above program may also be configured so that it is transmitted from a router or a node according to the present invention through the transmission media to another device to be installed therein.

INDUSTRIAL APPLICABILITY

According to the present invention, as described above, when two or more packets have a common route at least in part of their routes to respective terminal addresses, the information pieces of the packets are aggregated to create one aggregate packet. This can reduce the total number of packets transmitted on the network. The decrease in the total number of packets results in decreasing the number of references to the routing table and reducing the processing load, thereby increasing the processing speed. As a result, it becomes feasible to achieve the efficient utilization of the network resources.

The invention claimed is:

1. A routing method of, based on a destination address given to a packet, routing said packet, said method comprising:
   a step of extracting a destination address of a packet;
   a step of extracting two or more packets having a common route at least in part to their respective terminals, from a plurality of packets, based on their respective destination addresses thus extracted;
   a step of aggregating the two or more packets having the common route at least in part to create an aggregate packet including information of each of the packets;
   a step of giving said aggregate packet a destination address so that the destination address of said aggregate packet is an address of an adjacent node on said common route;
   a step of routing said aggregate packet, based on said destination address;
   a step of comparing a total number of bits of the two or more packets having the common route at least in part of the routes, with a number of bits of said aggregate packet; and
   a step of routing said aggregate packet, based on the destination address thereof, only when a result of the comparison is that the number of bits of said aggregate packet is smaller than the total number of bits of said two or more packets.

2. The routing method of claim 1, further comprising:
   a step of receiving said aggregate packet;
   a step of recovering said plurality of packets from said aggregate packet;
   a step of determining whether said recovered packets have a common downstream route at least in part to their respective terminals, based on destination addresses of the respective recovered packets; and a step of performing downstream routing in such a way that when the result of the determination is that the recovered packets have the common downstream route at least in part, said destination address of said aggregate packet is rewritten so that the rewritten destination address of said aggregate packet is an address of an adjacent node on said common downstream route, and the aggregate packet is routed based on the rewritten destination address, or in such a way that when the recovered packets have no common route, said recovered packets are routed based on their respective destination addresses.

3. The routing method according to claim 1, comprising a step of setting an aggregate flag indicating an aggregate packet, in header information of said aggregate packet.

4. The routing method according to claim 3, further comprising a step of compressing said aggregate packet by converting a bit pattern included in said aggregate packet, into a predetermined code.

5. The routing method according to claim 3, further comprising a step of compressing said aggregate packet by picking out a common bit string included in said plurality of packets, from at least one packet out of said two or more packets.

6. The routing method according to claim 1, wherein targets of aggregation are only packets buffered on a transmission queue.

7. A routing method of, based on a destination address given to a packet, routing said packet, said method comprising:
a step of extracting a destination address of a packet; a step of extracting two or more packets having a common route at least in part to their respective terminals, from a plurality of packets, based on their respective destination addresses thus extracted;
a step of aggregating the two or more packets having the common route at least in part to create an aggregate packet including information of each of the packets;
a step of giving said aggregate packet a destination address so that the destination address of said aggregate packet is an address of a predetermined node having a function of recovering the two or more original packets from said aggregate packet;
a step of routing said aggregate packet, based on said destination address thus determined;
a step of comparing a total number of bits of the two or more packets having the common route at least in part of the routes, with a number of bits of said aggregate packet; and
a step of routing said aggregate packet, based on the destination address thereof, only when a result of the comparison is that the number of bits of said aggregate packet is smaller than the total number of bits of said two or more packets.

8. The routing method according to claim 7, comprising a step of setting an aggregate flag indicating an aggregate packet, in header information of said aggregate packet.

9. The routing method according to claim 7, wherein targets of aggregation are only packets buffered on a transmission queue.

10. A system comprising a node for, based on a destination address given to a packet, routing said packet, said node comprising:
destination address extracting means for extracting a destination address of a packet; common-route packet extracting means for extracting two or more packets having a common route at least in part to their respective terminals, from a plurality of packets, based on their respective destination addresses thus extracted;
aggregate packet creating means for aggregating the two or more packets having the common route at least in part to create an aggregate packet including information of each of the packets;
destination address giving means for giving said aggregate packet a destination address so that the destination address of said aggregate packet is an address of an adjacent node on said common route;
aggregate packet routing means for routing said aggregate packet, based on said destination address; and
number-of-bits comparing means for comparing a total number of bits of the two or more packets having the common route at least in part of the routes, with a number of bits of said aggregate packet, wherein
said aggregate packet routing means routes said aggregate packet, based on the destination address thereof, only when a result of the comparison is that the number of bits of said aggregate packet is smaller than the total number of bits of said two or more packets.

11. The system of claim 10, further comprising:
a second node, comprising:
means for receiving said aggregate packet;
recovering means for recovering said plurality of packets from said aggregate packet;
determining means for determining whether said recovered packets have a common downstream route at least in part to their respective terminals, based on destination addresses of the respective recovered packets; and
packet routing means for performing downstream routing in such a way that when the result of the determination is that the recovered packets have the common downstream route at least in part, said destination address of said aggregate packet is rewritten so that the rewritten destination address of said aggregate packet is an address of an adjacent node on said common downstream route, and the aggregate packet is routed based on the rewritten destination address, or in such a way that when the recovered packets have no common downstream route, said recovered packets are routed based on their respective destination addresses.

12. The node according to claim 10, comprising aggregate flag setting means for setting an aggregate flag indicating an aggregate packet, in header information of said aggregate packet.

13. The node according to claim 12, further comprising aggregate packet compressing means for compressing said aggregate packet by converting a bit pattern included in said aggregate packet, into a predetermined code.

14. The node according to claim 12, further comprising aggregate packet compressing means for compressing said aggregate packet by picking out a common bit string included in said plurality of packets, from at least one packet out of said two or more packets.

15. The node according to claim 10, wherein targets of aggregation are only packets buffered on a transmission queue.

16. A packet communication system comprising a host for sending a packet; the node as set forth in claim 10, for relaying said packet; and a host for receiving said packet.

17. A node for, based on a destination address given to a packet, routing said packet, said node comprising:
destination address extracting means for extracting a destination address of a packet;
common-route packet extracting means for extracting two or more packets having a common route at least in part to their respective terminals, from a plurality of packets, based on their respective destination addresses thus extracted;

aggregate packet creating means for aggregating the two or more packets having the common route at least in part to create an aggregate packet including information of each of the packets;

destination address giving means for giving said aggregate packet a destination address so that the destination address of said aggregate packet is an address of a predetermined node having a function of recovering the two or more original packets from said aggregate packet;

aggregate packet routing means for routing said aggregate packet, based on said destination address thus determined; and number-of-bits comparing means for comparing a total number of bits of the two or more packets having the common route at least in part of the routes, with a number of bits of said aggregate packet, wherein said aggregate packet routing means routes said aggregate packet, based on the destination address thereof, only when a result of the comparison is that the number of bits of said aggregate packet is smaller than the total number of bits of said two or more packets.

18. The node according to claim 17, comprising aggregate flag setting means for setting an aggregate flag indicating an aggregate packet, in header information of said aggregate packet.

19. The node according to claim 17, wherein targets of aggregation are only packets buffered on a transmission queue.

20. A computer readable medium encodes with a computer program, the program for, based on a destination address given to a packet, routing said packet, said computer program being configured to make a communication device execute the following processes:

a process of extracting a destination address of a packet;

a process of extracting two or more packets having a common route at least in part to their respective terminals, from a plurality of packets, based on their respective destination addresses thus extracted;

a process of aggregating the two or more packets having the common route at least in part to create an aggregate packet including information of each of the packets;

a process of giving said aggregate packet a destination address so that the destination address of said aggregate packet is an address of an adjacent node on said common route;

a process of routing said aggregate packet, based on said destination address;

a process of comparing a total number of bits of the two or more packets having the common route at least in part of the routes, with a number of bits of said aggregate packet; and a process of routing said aggregate packet, based on the destination address thereof, only when a result of the comparison is that the number of bits of said aggregate packet is smaller than the total number of bits of said two or more packets.

21. The computer readable medium of claim 20, further comprising:

a process of receiving said extracted packet;

a process of recovering said plurality of packets from said aggregate packet;

a process of determining whether said recovered packets have a common downstream route at least in part to their respective terminals, based on destination addresses of the respective recovered packets; and a process of performing downstream routing in such a way that when the result of the determination is that the recovered packets have the common downstream route at least in part, said destination address of said aggregate packet is rewritten so that the rewritten destination address of said aggregate packet is an address of an adjacent node on said common downstream route, and the aggregate packet is routed based on the rewritten destination address, or in such a way that when the recovered packets have no common downstream route, said recovered packets are routed based on their respective destination addresses.

22. A computer readable medium encoded with a computer program, the program for, based on a destination address given to a packet, routing said packet, said computer program being configured to make a communication device execute the following processes:

a process of extracting a destination address of a packet;

a process of extracting two or more packets having a common route at least in part to their respective terminals, from a plurality of packets, based on their respective destination addresses thus extracted;

a process of aggregating the two or more packets having the common route at least in part to create an aggregate packet including information of each of the packets;

a process of giving said aggregate packet a destination address so that the destination address of said aggregate packet is an address of a predetermined node having a function of recovering the two or more original packets from said aggregate packet;

a process of routing said aggregate packet, based on said destination address thus determined;

a process of comparing a total number of bits of the two or more packets having the common route at least in part of the routes, with a number of bits of said aggregate packet; and a process of routing said aggregate packet, based on the destination address thereof, only when a result of the comparison is that the number of bits of said aggregate packet is smaller than the total number of bits of said two or more packets.

* * * * *